(12) United States Patent
Fukushima et al.

(10) Patent No.: US 7,532,225 B2
(45) Date of Patent: May 12, 2009

(54) THREE-DIMENSIONAL IMAGE DISPLAY DEVICE

(75) Inventors: Rieko Fukushima, Tokyo (JP); Tatsuo Saishu, Tokyo (JP); Kazuki Taira, Tokyo (JP); Yuzo Hirayama, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 775 days.

(21) Appl. No.: 10/943,198

(22) Filed: Sep. 17, 2004

(65) Prior Publication Data

US 2005/0099689 A1 May 12, 2005

(30) Foreign Application Priority Data

Sep. 18, 2003 (JP) .......................... P. 2003-326288

(51) Int. Cl.
*G09G 5/02* (2006.01)
(52) U.S. Cl. ....................................... 345/696; 359/462
(58) Field of Classification Search .................. 345/32, 345/6, 204, 87, 76, 82, 690–699; 348/51–59; 359/462–477
See application file for complete search history.

(56) References Cited

U.S. PATENT DOCUMENTS 7,180,478 B2 * 2/2007 Hamagishi et al. ............. 345/32

2004/0150583 A1 8/2004 Fukushima et al.
2005/0083246 A1 4/2005 Saishu et al.

FOREIGN PATENT DOCUMENTS

| JP | 07-005420 | 1/1995 |
|----|-----------|--------|
| JP | 07-015752 | 1/1995 |
| JP | 07-322305 | 12/1995 |
| JP | 09-022006 | 1/1997 |
| JP | 9-49986 | 2/1997 |
| JP | 09-096777 | 4/1997 |
| JP | 10-505689 | 6/1998 |
| JP | 10-336706 | 12/1998 |
| JP | 2000-102039 | 4/2000 |
| JP | 2003-121786 | 4/2003 |
| JP | 2003-185968 | 7/2003 |

OTHER PUBLICATIONS

Notification of Reason for Refusal issued by the Japanese Patent Office on Nov. 18, 2008, for Japanese Patent Application No. 2004-272412, and English-language translation thereof.

* cited by examiner

*Primary Examiner*—Amr Awad
*Assistant Examiner*—Stephen G Sherman
(74) *Attorney, Agent, or Firm*—Finnegan, Henderson, Farabow, Garrett & Dunner, L.L.P.

(57) ABSTRACT

A three-dimensional image display device includes a display unit having pixels arranged in a form of a matrix, the pixels forming pixel groups configured to display element images, and a mask having windows corresponding to the pixel groups. Preferably, relative positions of the pixel groups to the windows change cyclically.

24 Claims, 20 Drawing Sheets

FIG. 4A
DISPLAYED PARALLACTIC IMAGE
FIG. 4B
LINE CONNECTING CENTER OF IMAGE AND CENTER OF EXIT PUPIL
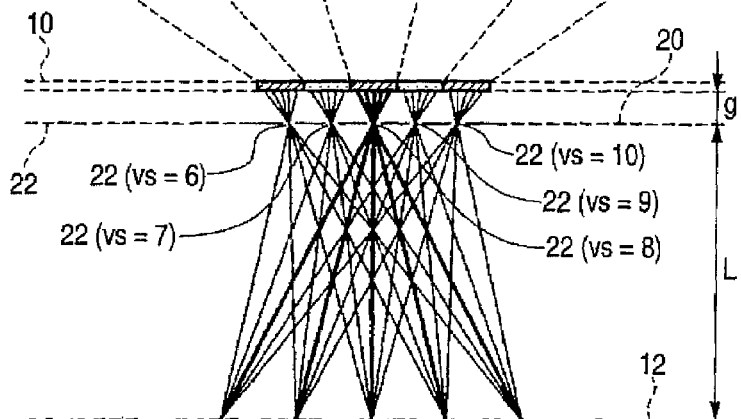
FIG. 4C
PARALLACTIC IMAGE NUMBER VISUALLY RECOGNIZED IN VIEWING DISTANCE
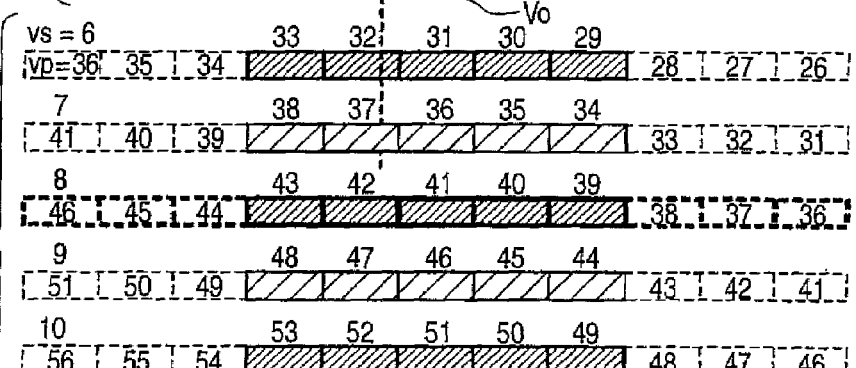

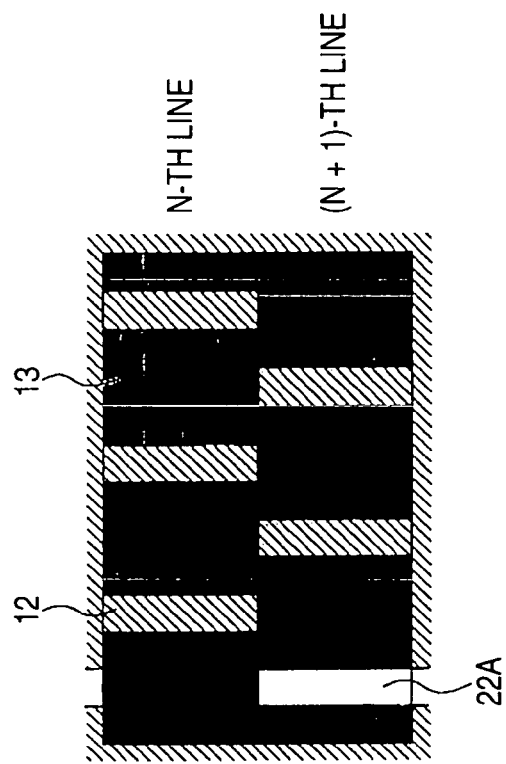
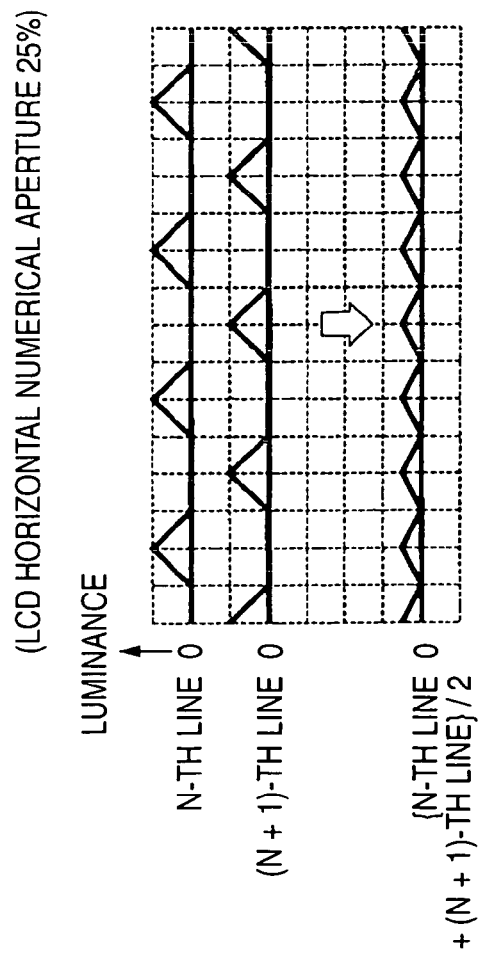
FIG. 7A
FIG. 7B

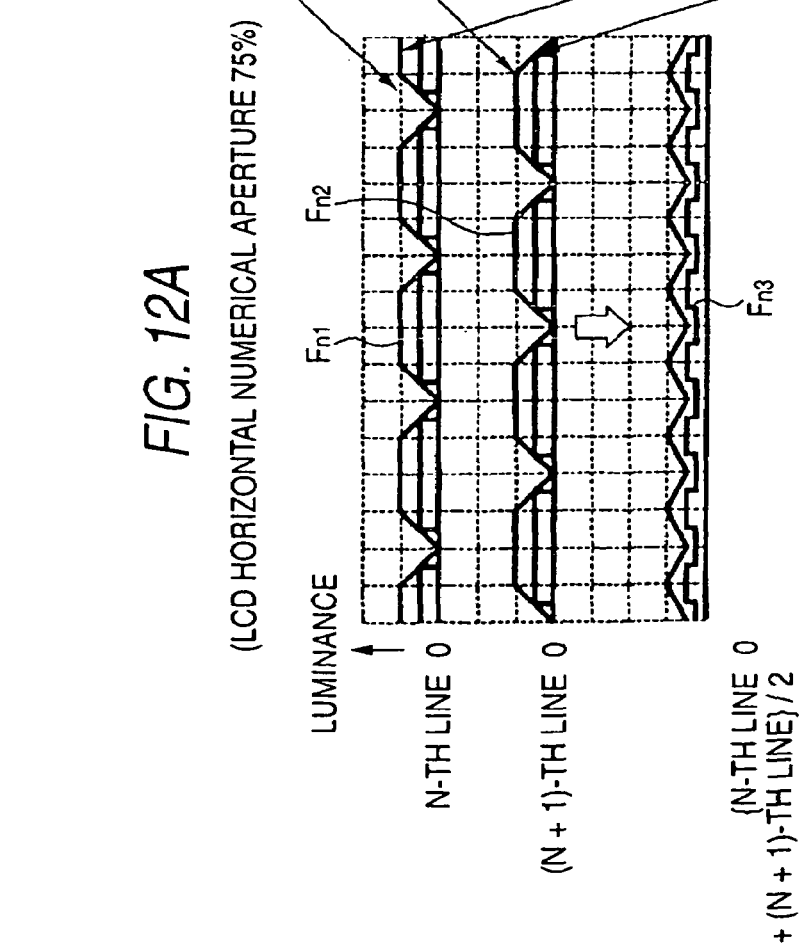
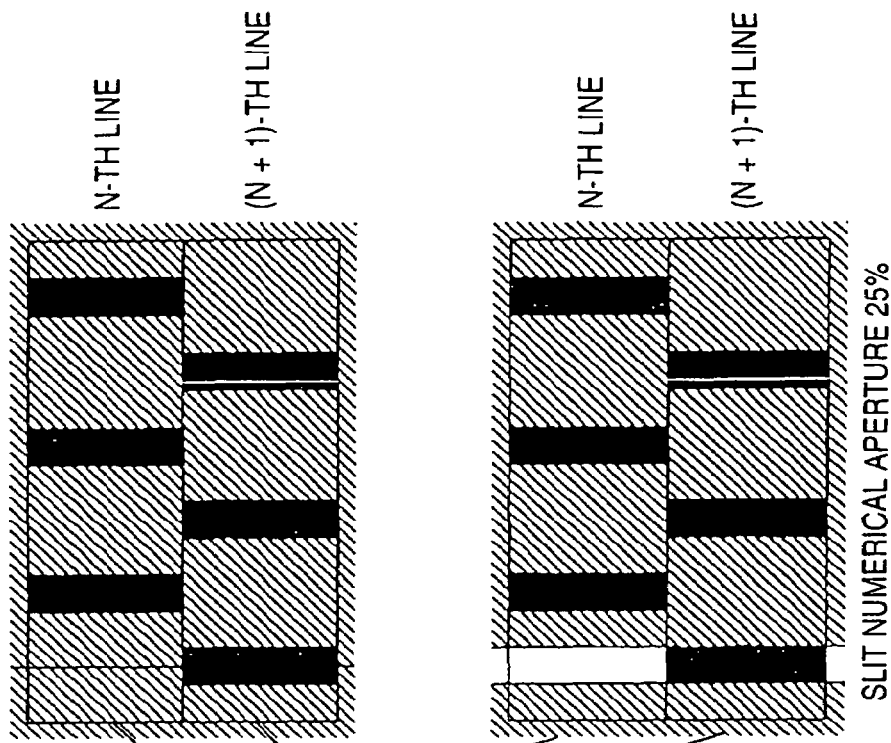
FIG. 12A
FIG. 12B
FIG. 12C

WINDOW NUMERICAL APERTURE 0%

SLIT NUMERICAL APERTURE 25%

(LCD HORIZONTAL NUMERICAL APERTURE 75%)

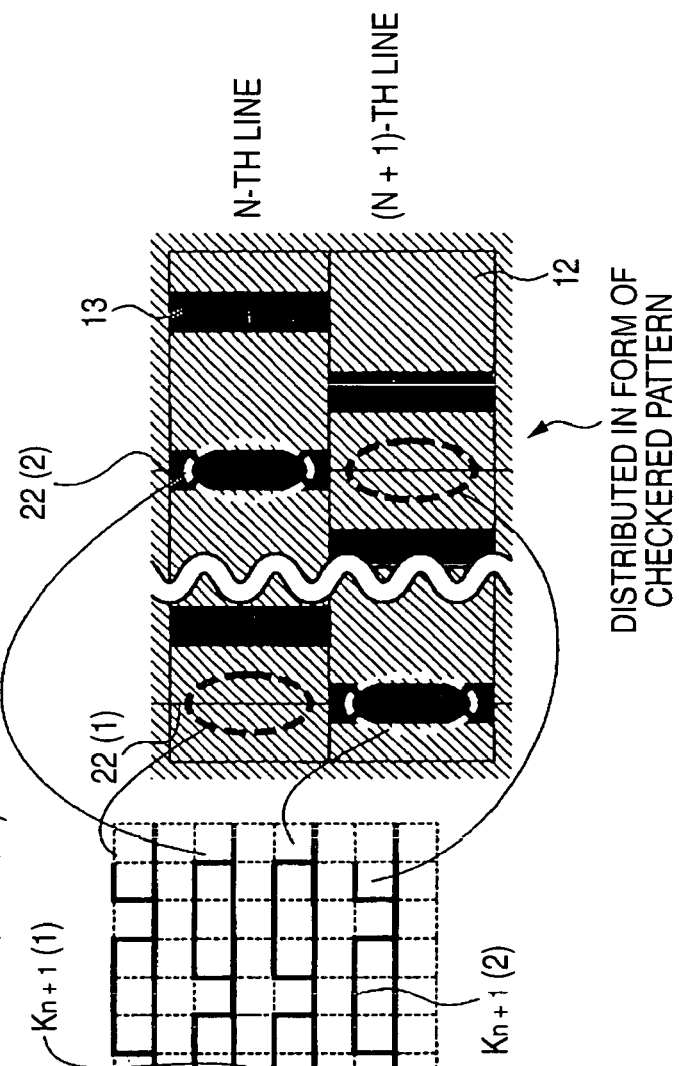
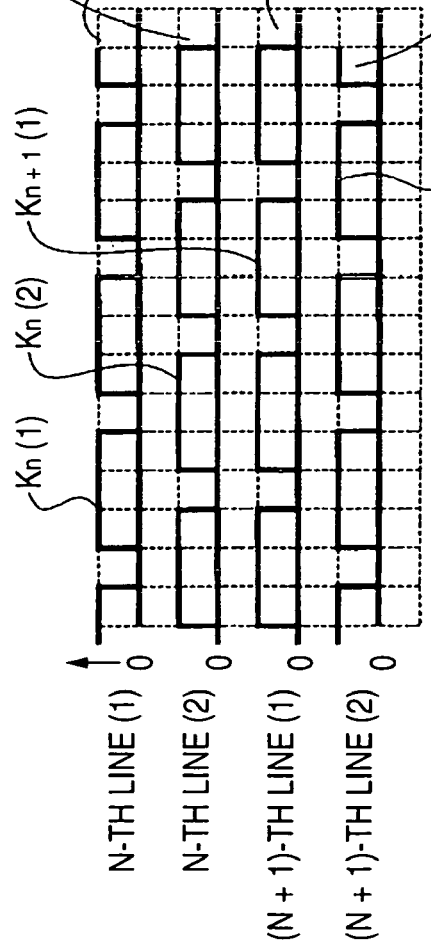
FIG. 14A
FIG. 14B (LCD HORIZONTAL NUMERICAL APERTURE 25%)

THREE-DIMENSIONAL IMAGE DISPLAY DEVICE

CROSS REFERENCE TO RELATED APPLICATIONS

This application is based upon and claims the benefit of priority from the prior Japanese Patent Applications No. 2003-326288, filed on Sep. 18, 2003; the entire contents of which are incorporated herein by reference.

BACKGROUND OF THE INVENTION

1. Field of the Invention

The present invention relates to a display device which can display a three-dimensional image, the display device including a mask and a display unit. Particularly it relates to a three-dimensional display device which includes a display unit having non-display portions for partitioning pixels and which can display a three-dimensional image.

2. Background Art

The technology for displaying a three-dimensional image can be classified by various methods. Generally, the technology is classified into a binocular parallax method using parallax between two eyes and a spatial image reproduction method that can form a spatial image actually.

The binocular parallax method is further classified into a binocular technique and a multi-view technique. The binocular technique is a method in which an image for the left eye and an image for the right eye are obtained at two recording points corresponding to the left and right eyes respectively so that the images can be viewed by the left and right eyes respectively. In comparison with the binocular technique, the multi-view technique is a method using a larger number of recording points.

The spatial image reproduction method is further classified into a holography technique and an integral photography technique (hereinafter referred to as IP technique). Although the IP technique may be often included in the binocular parallax method, the ideal IP technique must be included in the spatial image reproduction method. That is, in the IP technique, the path of light rays at the time of reproduction is quite reverse to the path of light rays at the time of photographing. Accordingly, in the IP technique in which the number of light rays can be made sufficiently large, a perfect three-dimensional image can be reproduced in a space. Incidentally, in the IP technique, a light ray group projected from the element image goes through an exit pupil, thereby defines a projection direction, to reproduce an three-dimensional image. The IP technique in which an photograph for printing an element image is replaced by an electronic display device such as a liquid crystal device (hereinafter referred to as LCD) is also called integral imaging technique (II technique) or integral videography technique (IV technique).

For the three-dimensional image display device such as the multi-view technique or the IP technique in which a three-dimensional image can be displayed without spectacles, a three-dimensional image display device using the following configuration will be taken as an example. That is, a display panel has a plurality of two-dimensional image display pixels arranged two-dimensionally, and a three-dimensional image display pixel is configured by the plurality of two-dimensional image display pixels. Three-dimensional image display pixel data are given to the two-dimensional image display pixels respectively to thereby display the element image on the three-dimensional image display pixels. A mask is disposed on the front surface of the display panel. The mask has windows which are far smaller in size than the three-dimensional pixels and typically nearly equal in size to the two-dimensional image display pixels and which are disposed so as to correspond to the three-dimensional image display pixels.

According to this configuration, most of the element images displayed by the three-dimensional image display pixels respectively are blocked by the mask, so that only light rays transmitted through the windows can be visually recognized by the observer. Accordingly, two-dimensional image display pixels visually recognized through a certain window can be changed in accordance with the position of observation, so that a three-dimensional image can be observed by the observer. With the naked eyes.

When this configuration is applied to the multi-view or binocular technique, it is however known that there occurs display inhibition supposed to be caused by non-display portions of the plurality of two-dimensional image display pixels arranged two-dimensionally. The non-display portions include regions in which a black matrix (BM) for covering wiring and switching device portions is formed in the LCD, and outer circumferential portions of regions in which respective LEDs are formed in the LCD. Display inhibition caused by the non-display portions will be described below.

The binocular technique is a three-dimensional image display technique that can be performed on the assumption that the position of observation is far by a viewing distance L from the display surface. In the binocular technique, it is designed so that two-dimensional images produced by perspective projection at two recording points are visually recognized by the right and left eyes far by the observation viewing distance (hereinafter referred to as viewing distance) L so as to be observed as a three-dimensional image by the binocular parallax. That is, it is designed so that each of the principal beams of the light rays to display three-dimensional images is focused on the pair of converging points on a plane far by the viewing distance L from the three-dimensional image, the two focus points are separated by an eye separation distance horizontally. According to this design, different images, that is, two-dimensional images produced at two photograph positions can be viewed at the position far by the viewing distance L from the display surface, by the observer's right and left eyes respectively without use of spectacles.

The multi-view technique can be conceived to be on extension of the binocular technique. In the multi-view technique, two or more pairs of converging points corresponding to the right and left eyes are set in a plane far from by the viewing distance L from the display surface. Moreover, the three-dimensional image display device is designed so that display light rays for displaying two-dimensional images produced by perspective projection at two or more pairs of corresponding observation positions are focused on the two or more pairs of converging points. According to this design, different images (two-dimensional images produced at each pair of photograph positions) can be viewed at the position far by the viewing distance L from the display surface, by the observer's right and left eyes respectively without use of spectacles. In addition, the image observed by the left eye and the image observed by the right eye can be exchanged with each other as the position of observation is moved to the left and/or right. Accordingly, the observer can confirm change in the three-dimensional image in accordance with the movement of the position of observation.

That is, in the binocular or multi-view technique, lines connecting the centers of a number (n; n≧2) of two-dimensional image display pixels arranged two-dimensionally to the center of each window are designed to cross one another on n converging points at a viewing distance. According to such design, corresponding two-dimensional image display pixels can be visually recognized when the eyes are located on the converging points. However, the positions where lines connecting the windows to boundaries between the plurality of two-dimensional image display pixels arranged two-dimensionally cross one another are inevitably generated between these converging points. There is a problem that non-display portions are visually recognized, i.e., luminance of the three-dimensional image becomes lower, when the eyes are located on such places.

As measures to solve this problem, two methods have been proposed in JP2000-102039(kokai) and JP7-5420(kokai). One is a method in which the horizontal pitch of windows (apertures) on one line is shifted by a value not smaller than a predetermined value decided on the basis of the horizontal pitch of three-dimensional image display pixels as disclosed in JP2000-102039(kokai). The other is a method in which the horizontal positions of windows with respect to the two-dimensional image display pixels on vertically adjacent regions on a display surface of the three-dimensional image display device are shifted by near ½ or near ⅓ as large as the horizontal pitch (hp_h) of two-dimensional image display pixels (JP7-5420(kokai), JP7-322305(kokai), JP2000-102039(kokai), JP7-15752(kokai), JP10-336706(kokai), JP9-96777(kokai), JP9-22006(kokai), and JP-T-10-505689 (the term "JP-T" as used herein means a published Japanese translation of a PCT patent application)). The term "near ½ or near ⅓" is, strictly, used here because the shift value needs to be slightly smaller than ½ or ⅓ as large as the horizontal pitch hp_h because focusing at a distance L is required of the multi-view technique. According to these methods, the non-display portions can be observed evenly at respective converging points though the number of two-dimensional image display pixels in which the centers of the two-dimensional image display pixels can be observed from the respective converging points at the viewing distance L is reduced to ½ or ⅓. More specifically, the number of focused lines among lines connecting the centers of the two-dimensional image display pixels to the centers of the windows is reduced to 1/m. The converging points increases to $m$ times as the number of focused lines decreases to 1/m.

In this method, it is however necessary to control the horizontal numerical aperture of two-dimensional image display pixels strictly. The horizontal numerical aperture is defined as a horizontal width of the part which light is projected or penetrates divided by hp_h. When, for example, a lens array having, as apertures, lenses designed for totally focusing light rays on the two-dimensional image display pixels is used as a mask so that the converging points are designed to increase to $m$ times instead of reduction in resolution of the two-dimensional image display pixels to 1/m, it is necessary to control the horizontal numerical aperture width of the two-dimensional image display pixels to 1/m times hp_h. This thing has been described in detail in JP7-5420(kokai), JP10-336706 (kokai), JP9-22006(kokai), and JP-T-10-505689. If the horizontal numerical aperture is set to be larger than this value, a region in which two-dimensional images observed among respective converging points overlap one another is generated to cause a problem that luminance in this region on the display surface increases as well as this region deteriorates an image quality of the three-dimensional image (generation of crosstalk). Although JP-T-10-505689 asserts that continuous motion parallax can be obtained, this assertion is correct on the assumption that parallactic images correlate closely with one another because the quantity of projection is small, that is, on the assumption that the difference between parallactic images is small. If the correlation between parallactic images is reduced because of increase in the quantity of projection, the parallactic images are visually recognized as double images. If the horizontal numerical aperture width is set to be smaller than 1/m times hp_h, the region in which only boundaries between the plurality of two-dimensional image display pixels arranged two-dimensionally is generated again at intervals of a pitch 1/m as large as the conventional pitch. The problem that only the non-display portions are observed occurs again when the eyes are located on this region. That is, the meaning of the design to increase the converging points to $m$ times is eliminated (JP10-336706(kokai) and JP-T-10-5055689).

The above description can be summarized as follows. In use of a lens array in which a focusing plane corresponds to the display unit as a mask, inhibition of stereoscopic view or variation in luminance occurs when the observer's head moves laterally if the horizontal numerical aperture is not strictly controlled to 1/m times hp_h. On the other hand, in use of lenses or windows, it is necessary to control the horizontal numerical aperture of the lenses or windows strictly in addition to the horizontal numerical aperture of the two-dimensional image display pixels. It is actually difficult to perform controlling in consideration of the diffraction effect of the lenses or windows. Even in the case where controlling can be made, variation in luminance at a distance out of the viewing distance is unavoidable. Because the shape of each window in the display unit is optimized individually on the basis of the display unit per se, it is undesirable from the point of view of production that the degree of freedom on design is lowered because of the problem peculiar to the three-dimensional display device. Moreover, the horizontal directions are discussed above, however, a three-dimensional image display device which gives parallax information also in the vertical directions includes a lens array having lens effects also in the vertical directions or a pinhole plate having pinholes spaced vertically. In this case, an luminance variation occurs due to the non-display portions in the vertical directions.

SUMMARY OF THE INVENTION

Display inhibition supposed to be caused by the non-display portions of the plurality of two-dimensional image display pixels arranged two-dimensionally occurs not only in the multi-view or binocular technique but also in the integral photography technique (IP technique). The non-display portions include regions in which a black matrix (BM) for covering wiring and switching device portions is formed in the LCD, and outer circumferential portions of regions in which respective LEDs are formed in the LCD. As stated above, in the three-dimensional image display device which combines a display unit and a mask to enable a stereoscopic view with naked eyes, a solution to the display inhibition caused by the non-display portions has been demanded. However, no effective method has been ever found.

Under such circumstances, an object of the invention is to provide a three-dimensional image display device which uses an electronic device and in which motion parallax continuous and without luminance variation can be achieved while a sense of display inhibition caused by non-display portions of the electronic device is eliminated.

According to the invention, there can be provided a three-dimensional image display device including a display unit having a pixels arranged in a form of a matrix, the pixels forming pixel groups configured to display element images, and a mask having windows corresponding to the pixel groups. Preferably, relative positions of the pixel groups to the windows change cyclically.

According to the invention, there can be provided a three-dimensional image display device in which motion parallax continuous and even in luminance can be achieved while a sense of display inhibition caused by non-display portions of an electronic device is eliminated.

BRIEF DESCRIPTION OF THE DRAWINGS

The present invention may be more readily described with reference to the accompanying drawings:

FIGS. 4A to 4C are schematic views showing the relations among the two-dimensional image display pixels, element images, the window-including mask, visual range and element images observed in a visual range reference plane in the three-dimensional image display device depicted in FIGS. 3A and 3B;

FIGS. 7A and 7B are plan views schematically showing change in luminance and arrangement of windows relative to two-dimensional image display pixels in the three-dimensional image display device depicted in FIGS. 3A and 3B in the case where the positions of the windows relative to the two-dimensional image display pixels are shifted in accordance with each line;

FIGS. 8A to 8F are pattern views for explaining combination of phase shift in a parallactic direction and phase shift in a non-parallactic direction with respect to the dispersion of moiré shown in FIGS. 5A and 5B, FIGS. 6A and 6B and FIGS. 7A and 7B;

FIGS. 12A to 12C are plan views schematically showing change in luminance and arrangement of windows relative to two-dimensional image display pixels in the three-dimensional image display device depicted in FIGS. 3A and 3B in the case where the positions of the windows relative to the two-dimensional image display pixels are shifted in accordance with each line;

FIGS. 14A to 14B are plan views schematically showing change in luminance and arrangement of windows relative to two-dimensional image display pixels in the three-dimensional image display device depicted in FIGS. 3A and 3B in the case where the positions of the windows relative to the two-dimensional image display pixels are shifted in accordance with each line and adjacent windows;

DETAILED DESCRIPTION OF THE PREFERRED EMBODIMENTS

Figure 1:
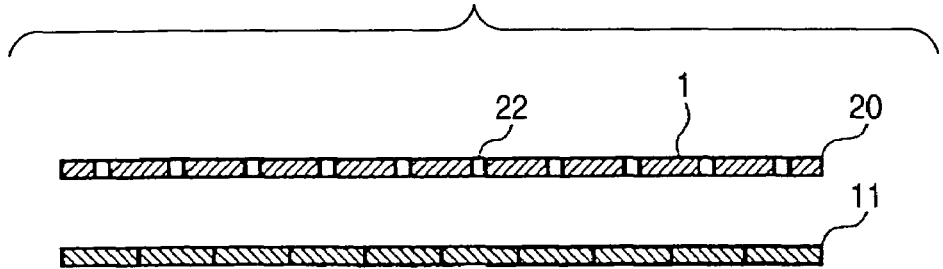
FIG. 1 is a sectional view schematically showing a three-dimensional image display device according to a first embodiment of the invention.

In the case where display inhibition caused by the non-display portions positioned around borders of the two-dimensional image display pixel is to be solved in a naked eye stereoscopic type three-dimensional image display device, it is difficult to equalize luminance in the multi-view or dense multi-view technique in which change in luminance occurs in a space where an observer positions because of the non-display portions (because it is necessary to keep the amount of light rays entering the pupil of the observer constant independently of the observation position). On the other hand, it is known that reduction in luminance caused by the non-display portions occurs in the display surface of the three-dimensional display device when the IP technique is used. According to the inventors' examination, it is found that an average luminance of the entire plane including the luminance distribution within this display surface (hereinafter referred to as moiré) is approximately constant independently of the observation position. That is, it is found that it can more surely remove the display inhibition caused by the non-display portions by distribute the moiré occurring in the IP technique in the display surface than suppressing the luminance variation depending no the observer's position in the binocular or multi-view technique.

A method for the three-dimensional display device of the naked eye stereoscopic view type to distribute moiré to remove reduction in luminance caused by the non-display portions into the display surface in use of the IP technique will be described below.

A three-dimensional image display device according to embodiments of the invention will be described below with reference to the drawings. Incidentally, in the respective drawings, constituent members having the same or like functions are designated by the same reference numerals for the sake of omission of duplicated description.

FIG. 1 is a sectional view schematically showing a three-dimensional image display device according to a first embodiment of the invention. The three-dimensional image display device 1 shown in FIG. 1 can display a three-dimensional image by the IP technique. The three-dimensional image display device 1 includes three-dimensional image display pixels 11 arranged vertically and horizontally, and a mask 20 disposed at a distance from the three-dimensional image display pixels 11 and having windows (apertures) 22 corresponding to the three-dimensional image display pixels 11. An element image based on the three-dimensional image display pixels 11 is displayed when a display panel having two-dimensional image display pixels arranged two-dimensionally is driven while pixel data are given to the display panel. In this specification, a group of two-dimensional image display pixels corresponding to the windows for displaying element images are called "three-dimensional image display pixels 11".

Figure 2:
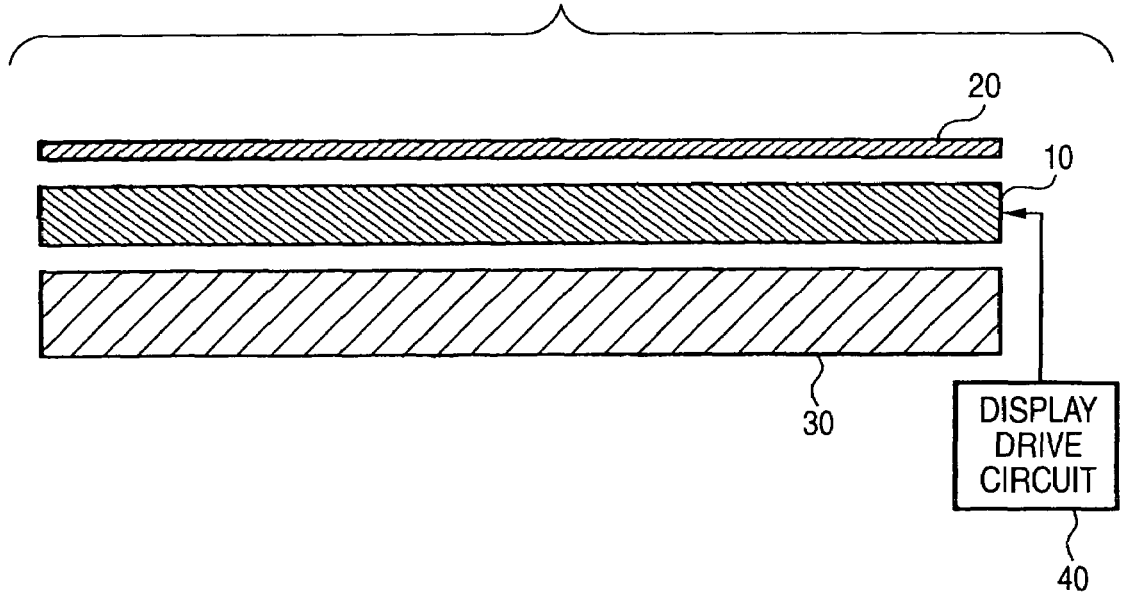
FIG. 2 is a sectional view schematically showing the three-dimensional image display device achieved by use of a liquid crystal display unit having a structure shown in FIG. 1.

FIG. 2 is a sectional view schematically showing a three-dimensional image display device in which the structure shown in FIG. 1 is achieved by use of a liquid crystal display unit. In FIG. 2, the three-dimensional image display pixels 11 are constituted by a transmissive liquid crystal display unit 10 as a display panel. A backlight unit 30 which is a surface light source is disposed at the rear of the liquid crystal display unit 10. A mask 20 is disposed in front of the liquid crystal display unit 10. Though not shown, lenses such as lenticular sheets having the same function as that of the mask 20, e.g., having a focal length corresponding to the pixel portion of the liquid crystal display device, may be disposed instead of the mask 20 in front of the liquid crystal display unit 10. The liquid crystal display unit 10 is driven by a display drive circuit 40 so that a three-dimensional display image is displayed on the display unit 10.

Incidentally, when the transmissive liquid crystal display unit 10 is used, the mask 20 may be disposed between the backlight unit 30 and the liquid crystal display unit 10. The liquid crystal display unit 10 and the backlight unit 30 may be replaced by a self-luminous display unit such as an organic electroluminescence (EL) display unit, a cathode-ray tube display unit or a plasma display unit. In this case, the mask 20 is disposed in front of the self-luminous display unit.

Any mask 20 is specifically a unit in which a light-shielding pattern having openings (apertures or windows) equivalent to the windows 22 is formed on a transparent board or a unit in which through-holes equivalent to the windows 22 are formed in a light-shielded plate. It is used for giving parallax information only in the horizontal direction. In case of giving parallax information also in the vertical direction, a pinhole lens plate, a microlens array or the like is used. Furthermore, like a transmissive liquid crystal display unit, the mask 20 may be designed so that the arrangement, size, shape, etc. of the windows 22 can be changed freely. The concept "windows 22" includes not only openings such as windows but also optical openings in a lens system. In an optical sense, each window 22 serves as an exit pupil having a function of limiting light rays in a specific direction.

Figure 3A:
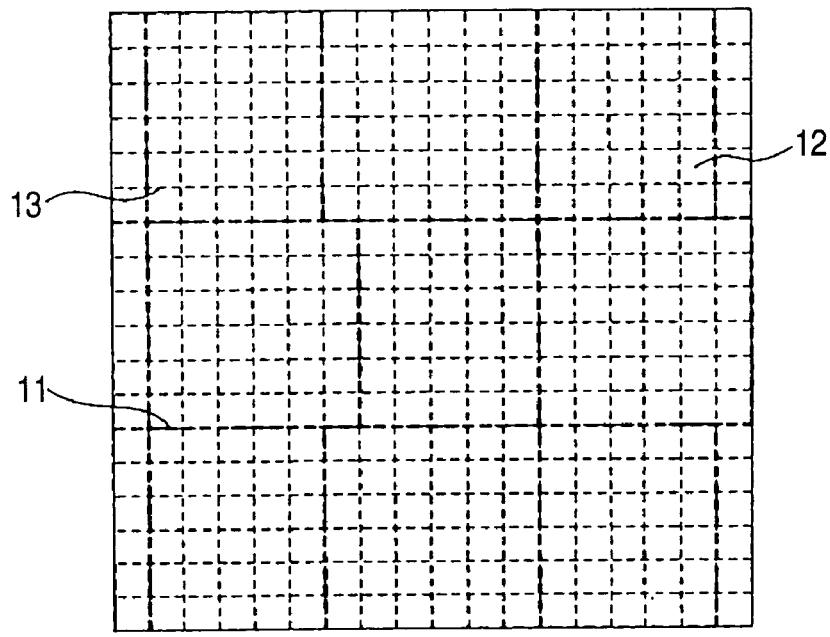
FIG. 3A is a plan view schematically showing an example of structure that can be used for three-dimensional image display pixels in the three-dimensional image display device depicted in FIG. 1.
Figure 3B:
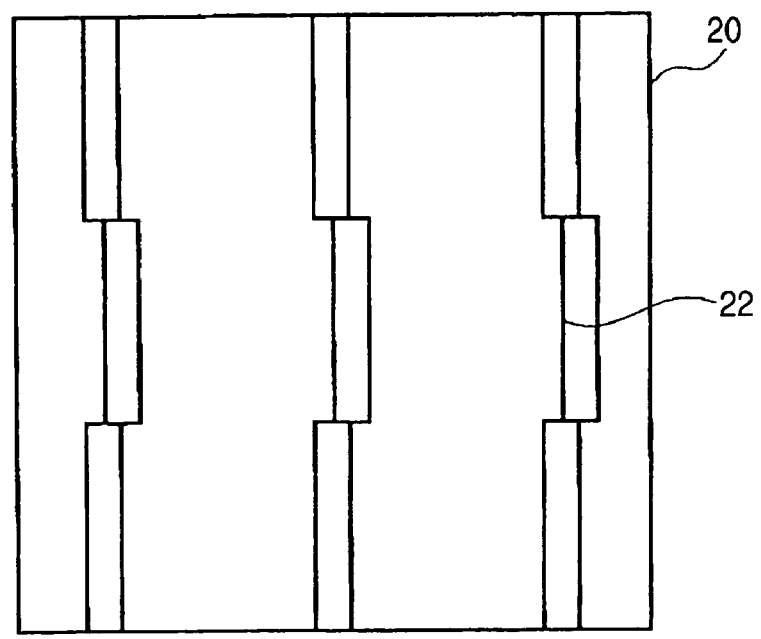
FIG. 3B is a plan view schematically showing an example of structure that can be used for a mask in the three-dimensional image display device depicted in FIG. 1.

FIG. 3A is a plan view schematically showing an example of structure that can be applied to the three-dimensional image display pixels 11 in the three-dimensional image display device 1 depicted in FIG. 1. FIG. 3B is a plan view schematically showing an example of structure that can be applied to the mask 20 having a function of a mask in the three-dimensional image display device 1 depicted in FIG. 1.

As shown in FIG. 3A, each three-dimensional image display pixel 11 is composed of a plurality of sub pixels 12, for example, (6×6) or (6×7) sub pixels 12 arranged two-dimensionally. The respective sub pixels 12 are partitioned by a black matrix (BM) 13. In FIG. 3A, each sub pixel 12 is expressed by the solid line whereas each three-dimensional image display pixel 11 is expressed by the broken line in order to make the drawing clear. FIG. 3A shows an example of a mask which gives only horizontal parallax. In first six lines, since a distance between horizontally adjacent windows is set 6.5 times the horizontal width of the sub pixel (hp_h), between the horizontally adjacent windows the horizontal positions of the windows 22 relative to the two-dimensional image display pixels are shifted by a half pitch (hereinafter referring to as hp_h×½). In next six lines, since a distance between horizontally adjacent windows is set hp_h×6.5, the positions of the windows relative to the two-dimensional image display pixels are shifted by hp_h×½ and, moreover, adjacent windows 22 of the first six lines and the last six lines are disposed so that the horizontal positions of the windows relative to the two-dimensional image display pixels are shifted by hp_h×½. That is, in this example of arrangement, all the windows 22 are arranged at intervals of the same pitch along lines. In (2n×6+m)-th lines or {(2n+1)×6+m}-th lines, where n is a non-negative integer and m is an integer of 1 to 6, the windows 22 are in phase with one another. Between (2n×6+m)-th line and {(2n+1)×6+m}-th line, the positions of the windows relative to the two-dimensional image display pixels are horizontally shifted by a half pitch in terms of phase. By the above configuration, moiré caused by a regular pattern as will be described later can be reduced even in the case where the mask 20 having the windows 22 arranged at regular intervals and the display unit 10 having the three-dimensional image display pixels 11 arranged at regular intervals are disposed opposite to each other through a gap provided between the mask 20 and the display unit 10.

Incidentally, when the three-dimensional image display device 1 is of a monochrome type, all the sub pixels 12 have one display color. Accordingly, one sub pixel 12 can serve as one two-dimensional image display pixel. In this case, a shape similar to the shape of one sub pixel 12 is generally given to each window 22. Typically, the shape and size nearly equal to those of one sub pixel 12 are given to each window 22.

On the other hand, when the three-dimensional image display device 1 is of a full color type, three sub pixels 12 having display colors of red, green and blue respectively can form one two-dimensional image display pixel. Alternatively, red, green and blue sub pixels 12 may form two-dimensional image display pixels respectively. In the former case, each window 22 generally has a shape similar to the shape of one two-dimensional image display pixel composed of three sub pixels 12 having display colors of red, green and blue respectively. Typically, each window 22 has a shape and size nearly equal to those of one two-dimensional image display pixel. In the latter case, a shape similar to the shape of one sub pixel 12 is generally given to each window 22. Typically, the shape and size nearly equal to those of one sub pixel 12 are given to each window 22.

In the three-dimensional image display device shown in FIGS. 1 and 2, element images (vs=6 to 10) constituted by a plurality of parallactic images delicately different in looks in accordance with the viewing angle as shown in FIGS. 4A and 4B are displayed on the three-dimensional image display pixels 11 provided in the display unit 10. The element images (vs=6 to 10) have one-to-one correspondence with the windows 22. Accordingly, in FIG. 4B showing the two-dimensional image display pixels, the windows 22 corresponding to the element images (vs=6 to 10) are additionally designated by the reference symbols (vs=6 to 10) in order to express correspondence with the element images (vs=6 to 10). For example, the window corresponding to the element image (vs=6) is designated by a reference number 22 and an additional reference symbol (vs=6). Incidentally, a gap shown by a distance g is provided between the display unit 10 and the mask 20. As shown in FIGS. 4A and 4B, the element images (vs=6 to 10) are constituted by two-dimensional image display pixels (vp=28 to 54). For example, one element image (vs=8) is constituted by two-dimensional image display pixels (vp=39 to 43).

Only light rays emitted from a large number of patterns equivalent to the element images emitted ahead of the display device through the windows 22 corresponding to the element images, are observed by the observer. The light rays projected onto the front surface of the mask 20 form an element image light ray group. The element image light ray group forms a three-dimensional real image in front of the windows 22. further forms A three-dimensional virtual image is further formed on its locus extrapolating the element image light ray group on the back side of the mask 20. That is, a three-dimensional virtual image is formed by the element image light ray group advancing from the observer to the patterns on the display unit 10 through the mask 20 having the windows 22 whereas a three-dimensional real image is formed by the element image light ray group advancing from the patterns on the display unit 10 to the observer through the windows 22.

As shown in FIG. 4B, in the three-dimensional image display device, a viewing distance L is decided as a reference for arranging the element images (vs=6 to 10) on the display unit 10. A visual range reference plane 12 is decided as a horizontal plane at the viewing distance L. In FIG. 4B, hva expresses the width of a horizontal visual range on the visual range reference plane 12, and Vo expresses the center of the visual range. The element images (vs=6 to 10) are disposed so as to be biased with respect to the windows 22 so that the locus of the light rays from the element images is made incident into the nearly same range on the visual range reference plane. Here, the concept "visual range" means a region in which only a three-dimensional true image is observed. The visual range is equivalent to a region except a mixture image region in which a false image formed by light rays transmitted through a window adjacent to the originally working window is observed together with the true image as a three-dimensional image and a false image region in which only the false image is observed. When the element images (vs=6 to 10) corresponding to the windows 22 are disposed appropriately relative to the centers of the windows 22 respectively in the aforementioned manner, all light rays emitted from the element images (vs=6 to 10) and transmitted through the windows 22 (vs=6 to 10) approximately overlap one another on the region at the viewing distance L to thereby substantially maximize the width hva of the visual range where the true image can be observed.

In the example of arrangement shown in FIGS. 4A and 4B, the width hva of the visual range may be substantially maximized as follows. On the assumption that the horizontal pitch hp_h of the sub pixels and the horizontal pitch hsp_h of the windows (apertures) are constant, additive three-dimensional image display pixels Px' constituted by (Nvs+1) two-dimensional image display pixel groups for displaying parallactic images of the parallactic image number (Nvs+1) obtained by adding 1 to the reference parallactic image number Nvs may be provided discretely in addition to the standard three-dimensional image display pixels constituted by two-dimensional image display pixel groups in which the number of two-dimensional image display pixels is Nvs for displaying parallactic images of the reference horizontal parallactic image number Nvs as pixel positions depart from the region facing the center of the visual range in the display unit 10. That is, as shown in FIG. 4A, three-dimensional image display pixels for displaying an element image (vs=8) located in the center of the visual range are constituted by five two-dimensional image display pixels (vp=39 to 43). On the other hand, three-dimensional image display pixels for displaying an element image (vs=7 or 9) located on each side of the element image (vs=8) may be equivalent to additive three-dimensional image display pixels Px' and may be constituted by six two-dimensional image display pixels (vp=33 to 38 or vp=44 to 49). Accordingly, the element images (vs=7 and 9) are arranged so as to be biased with respect to corresponding windows. Three-dimensional image display pixels (vs=6 or 10) further outside the three-dimensional image display pixels (vs=7 or 9) are constituted by five two-dimensional image display pixels (vp=28 to 32 or vp=50 to 54). Although the three-dimensional image display pixels for displaying an element image (vs=6 or 10) are constituted by two-dimensional image display pixels of the same number as the number of two-dimensional image display pixels for the center element image (vs=8), the element image (vs=6 or 10) is also disposed so as to be biased outwardly by one two-dimensional image display pixel with respect to the corresponding window because the element image (vs=7 or 9) is biased. When additive three-dimensional image display pixels Px' are provided discretely or cyclically in the aforementioned manner, the width hva of the visual range can be substantially maximized.

In the aforementioned display method, the relation between the two-dimensional image display pixels for forming the three-dimensional image display pixels 11 and the windows (apertures) 22 of the mask 20 is decided on the basis of the inventors' examination as follows. Display inhibition caused by the non-display portions of the electronic device, for example, inhibition caused by a moiré image is reduced, so that motion parallax continuous and uniform in luminance can be achieved in the three-dimensional image display device.

The inventors have deepened understanding of display inhibition caused by the non-display portions. As a result, the inventors have paid attention to the fact that in the multi-view technique display inhibition can be eliminated when the place where the non-display portions are visually recognized is not dispersed spatially but when the region where the IP technique is employed, the structure is optimized and the non-display portions are visually recognize is equalized in the display surface. It has been clarified that the display inhibition can be eliminated.

In this specification, the "IP technique" and the "multi-view technique" are distinguished from each other on the basis of the following point of difference.

The IP technique is a three-dimensional image display method which is designed so that two-dimensional images produced at respective photograph positions are not focused on one point. Specifically, assume the case where the position of observation is infinitely far from the display surface. In this case, the IP technique is designed so that the image observed by one eye is exchanged in accordance with the images produced at the plurality of photograph positions and in accordance with the angle of observation, i.e., in the IP technique an image produced with the parallel projection. For example, the position of observation is infinitely far from the display surface, it is designed so that the image observed by one eye is exchanged in accordance with the images produced at the plurality of photograph positions and in accordance with the angle of observation. Specifically, images produced by parallel projection different from perspective projection used in the multi-view technique are used in the IP technique.

According to this design, the two-dimensional image observed by one eye is never equal to the two-dimensional image produced at any photograph position because observation from the position infinitely far from the display surface is not real in the IP technique. Each of the two-dimensional image observed by the right eye and the two-dimensional image observed by the left eye is however formed by addition of images produced by parallel projection from a plurality of directions. Accordingly, the averaged two-dimensional image can be regarded as a two-dimensional image produced at the position of observation by perspective projection. According to this configuration, different images can be observed by the right and left eyes respectively, so that the three-dimensional image perceived by the observer becomes equal to the three-dimensional image which is recognized when a produced object is actually observed from any direction.

Display inhibition caused by the non-display portions in the IP technique, especially a cause of moiré will be described below. The configuration of the IP technique is characterized in that images produced by parallel projection are used as described above. For this reason, the positional relation between the plurality of two-dimensional image display pixels and the windows in the display device is kept constant. That is, the display device is designed so that lines connecting the centers of the two-dimensional image display pixels to the centers of the windows respectively are parallel to one another.

The IP technique (one-dimensional IP technique) in which only horizontal parallactic information is given will be described below for the sake of simplification. A configuration using lenticular sheet will be described as a fundamental example. In the IP technique, the positions of the element images on the display unit 10 relative to the windows 22 of the mask are kept constant as described above. Accordingly, when observation is made from a certain viewing distance L by perspective protection, the positions in the element images observed from the windows 22 change cyclically. That is, the non-display portions which are boundaries between the two-dimensional image display pixels are also visually recognized cyclically. For this reason, in the one-dimensional IP technique, reduction in luminance due to visual recognition of the non-display portions is visually recognized as vertical moiré fringes. The numbers of moiré fringes (bright and darkness) varies depending on the viewing distance. (The number of moiré fringes increases as the viewing point comes near to the display, and decreases as the viewing point goes far from the display. At an infinite far point, the number of moiré fringes becomes zero.) As a result of examination on moiré as display inhibition caused in the IP technique by the non-display portions, it has been proved that moiré can be solved by the following two methods.

(1) Phase Shift in Non-Parallactic Direction

The positions of the two-dimensional image display pixels relative to the windows 22 in element images or element image groups adjacent to each other in a direction of no parallactic information are shifted to thereby shift the positions of occurrence of moiré. This is equivalent to the case where the positions of the windows relative to the two-dimensional image display pixels are shifted by a half pitch every six lines as described above with reference to FIGS. 3A and 3B. This corresponds to embodiments which will be described later with reference to FIGS. 5A, 5B, 6A, 6B, 7A and 7B, and FIGS. 10A to 10C, 11A to 11C, 12A to 12C and 13A to 13C.

(2) Phase Shift in Parallactic Direction

The positions of the two-dimensional image display pixels relative to the two-dimensional image display pixel windows 22 in element images or element image groups adjacent to each other in a direction of provision of parallactic information are shifted to eliminate moiré. This corresponds to embodiments which will be described later with reference to FIG. 14A to FIG. 15B.

Embodiments concerning (1) phase shift in non-parallactic direction and (2) phase shift in parallactic direction will be described below with reference to the drawings.

In (1) phase shift in non-parallactic direction in the one-dimensional IP technique, the positions of the two-dimensional image display pixels relative to the windows are shifted between lines to thereby shift the position of occurrence of moiré on each line. Although the relative positions of the two-dimensional image display pixels are shifted between lines, they may be shifted between regions each composed of a plurality of lines. When the positions of the two-dimensional image display pixels relative to the windows are shifted cyclically, the position of occurrence of moiré can be shifted.

Figure 5A:
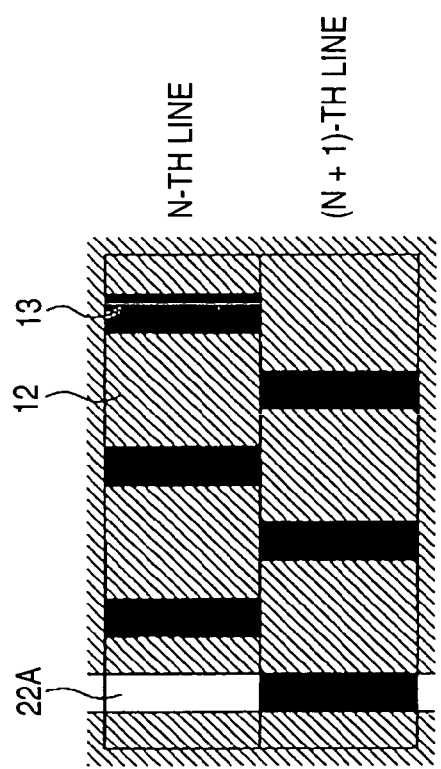
FIGS. 5A and 5B are plan views schematically showing change in luminance and arrangement of windows relative to two-dimensional image display pixels in the three-dimensional image display device depicted in FIGS. 3A and 3B in the case where the positions of the windows relative to the two-dimensional image display pixels are shifted in accordance with each line.
Figure 5B:
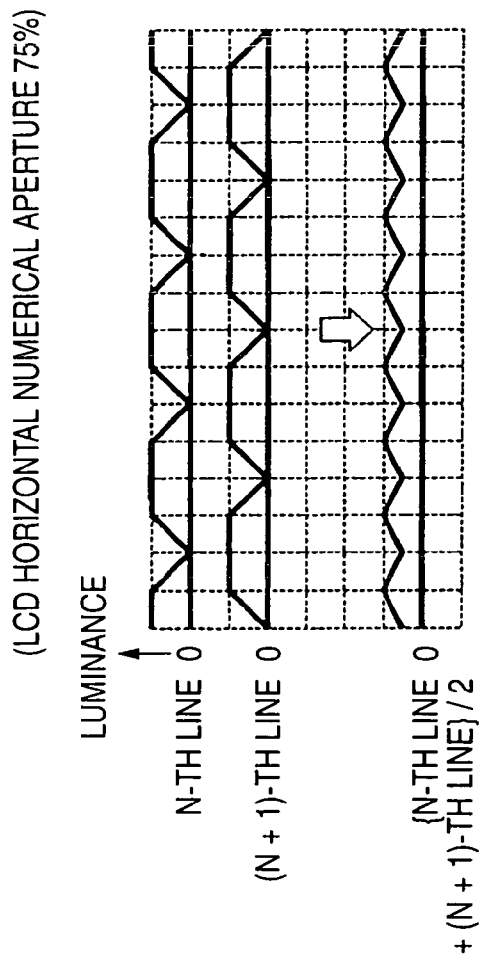

In an embodiment shown in FIGS. 5A and 5B, a liquid crystal display unit having a horizontal numerical aperture of 75% is used as the display unit 10. Here, the term "horizontal numerical aperture" means the rate of the opening portions 12 of the two-dimensional image display pixels to the two-dimensional image display pixel pitch (hp_h). The horizontal numerical aperture of 75% means that 75% of the two-dimensional image display pixels (hp_h×0.75) are opening portions 12 and the percentage of the non-display portions (such as a black matrix (BM) 13) provided in boundaries between the two-dimensional image display pixels 12 in the opening portions 12 is 25% (hp_h×0.25). In FIG. 5B, the display unit and the mask are drawn while overlapping each other. The non-window portions 12 of the mask are expressed as hatched portions to be distinguished from the window portions each having a horizontal width set at 50% (hp_h×0.50) as large as the pitch of the two-dimensional image display pixels. On the other hand, the BM 13 in the display unit is expressed as black portions to be distinguished from the opening portions. The mask 20 may be conceived to be lens pupils. In the other drawings which will be described hereunder, these are drawn in the same manner as described above.

In FIG. 5B, the two-dimensional image display pixels 12 on the N-th line are arranged so as not to be in phase with the two-dimensional image display pixels 12 on the (N+1)-th line. That is, the two-dimensional image display pixels 12 on the (N+1)-th line are arranged so that the phase is shifted by (hp_h×½). Accordingly, on the N-th line, the window 22A substantially faces the center of the two-dimensional image display pixels 12. On the other hand, on the (N+1)-th line, the windows 22A faces the BM 13. Accordingly, the N line and the (N+1)-th line are disposed so that the phase of occurrence of moiré is shifted by π. In the positional relation, moiré visually recognized as vertical fringes without phase shift can be arranged in the form of a checkered pattern. FIG. 5A shows change in luminance observed through the window in the case where the position of the display unit relative to the mask is shifted horizontally from the positional relation shown in FIG. 5B. The fact that luminance in FIG. 5A changes means the fact that luminance observed through the plurality of windows is not uniform when the observer makes observation by perspective projection, that is, the fact that moiré is visually recognized. Similarly, the fact that luminance in FIG. 5A does not change means the fact that luminance observed through the plurality of windows is uniform, that is, the fact that moiré is not visually recognized. In FIG. 5A, on the N-th line and the (N+1)-th line, reduction in luminance appears cyclically in accordance with the appearance of the BM 13. The N-th line and the (N+1)-th line are disposed so that the phase of moiré caused by the reduction in luminance is shifted by a half of the moiré generation period. Accordingly, when the N-th line and the (N+1)-th line are observed simultaneously from a single window, the cyclic change of luminance on both lines is averaged so that change of luminance is reduced to half so as to be equalized while the period in change of luminance is increased to twice as represented by {N-th line+(N+1)-th line}/2. Accordingly, moiré becomes inconspicuous when the two-dimensional image display pixels 12 are observed from the observation side through the window 22A. In other words, display inhibition in the three-dimensional image display device can be prevented.

Figure 6A:
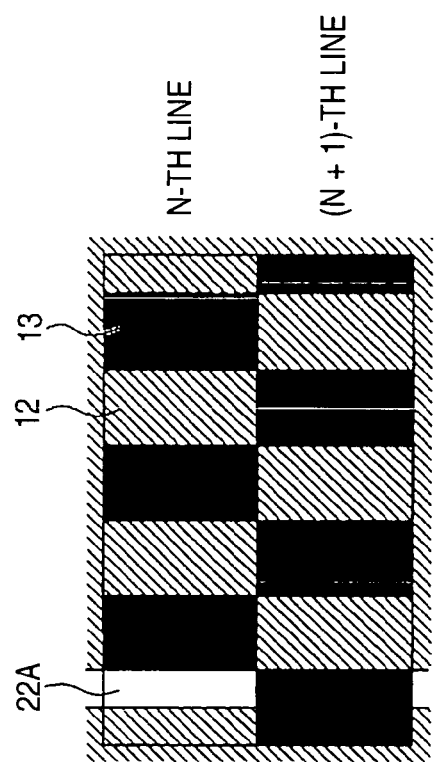
FIGS. 6A and 6B are plan views schematically showing change in luminance and arrangement of windows relative to two-dimensional image display pixels in the three-dimensional image display device depicted in FIGS. 3A and 3B in the case where the positions of the windows relative to the two-dimensional image display pixels are shifted in accordance with each line.
Figure 6B:
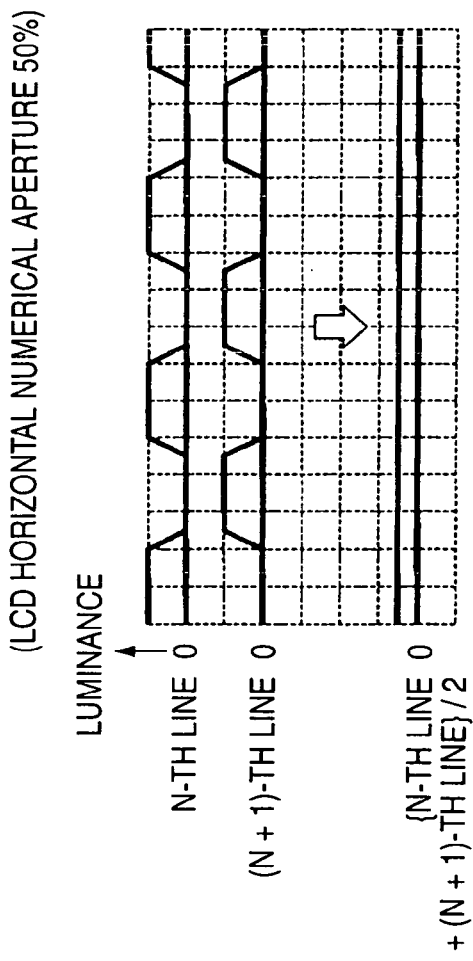

FIG. 6A shows change in luminance observed through the window in the display unit 10 in the same manner as in FIG. 5A. FIG. 6B shows the positional relation in the case where the window 22 overlaps the two-dimensional image display pixels 12 in the display unit 10 in the same manner as in FIG. 5B. FIGS. 6A and 6B are however different from FIGS. 5A and 5B in that FIGS. 6A and 6B show the case where the horizontal numerical aperture is 50%. In the arrangement shown in FIG. 6B, reduction in luminance appears cyclically on the N-th line and the (N+1)-th line in accordance with the appearance of the BM 13 and moiré is generated as shown in FIG. 6A. The N-th line and the (N+1)-th line are disposed so that the phase of moiré caused by the reduction in luminance is shifted by a half of the moiré generation period. Moreover, the waveforms of luminance on the N-th line and the (N+1)-th line are substantially equal to each other except for only the phase shift by the half phase because the horizontal numerical aperture is 50%, though the phases of the waveforms are different by a half phase. Accordingly, when the N-th line and the (N+1)-th line are observed simultaneously from a single window, the cyclic change of luminance on both lines is averaged to substantially eliminate change of luminance to thereby keep luminance nearly constant as represented by {N-th line+(N+1)-th line}/2. That is, even in the case where the two-dimensional image display pixels 12 are observed from the observation side through any window 22A, constant luminance can be obtained. Accordingly, moiré can be eliminated, so that the most ideal display can be obtained.

FIG. 7A shows change in luminance observed through the window in the display unit 10 in the same manner as in FIGS. 5A and 6A. FIG. 7B shows the positional relation in the case where the window 22 overlaps the two-dimensional image display pixels 12 in the display unit 10 in the same manner as in FIGS. 5B and 6B. FIGS. 7A and 7B are however different from FIGS. 5A and 5B in that FIGS. 7A and 7B show the case where the horizontal numerical aperture is limited to 25% (hp_h×0.25). In the arrangement shown in FIG. 7B, reduction in luminance appears cyclically on the N-th line and the (N+1)-th line in accordance with the appearance of the BM 13 as shown in FIG. 7A. The N-th line and the (N+1)-th line are disposed so that the phase of moiré caused by the reduction in luminance is shifted by a half of the moiré generation period. Moreover, in the waveforms of luminance on the N-th line and the (N+1)-th line, a state in which the window is perfectly blocked occurs easily because the horizontal numerical aperture is 25% (hp_h×0.25). Accordingly, when the N-th line and the (N+1)-th line are observed simultaneously from a single window, the cyclic change of luminance on both lines is averaged so that change in luminance is reduced to half so as to be equalized while the period in change of luminance is increased to twice as represented by {N-th line+(N+1)-th line}/2. The lowest luminance however becomes perfectly zero. Accordingly, contrast (=maximum luminance/minimum luminance) of moiré becomes infinitely large. When the two-dimensional image display pixels 12 are observed from the observation side through the window 22A, moiré is apt to be visually recognized compared with the case where the horizontal numerical aperture is 75% (hp_h×0.75).

Figures 10A, 10B, 10C:
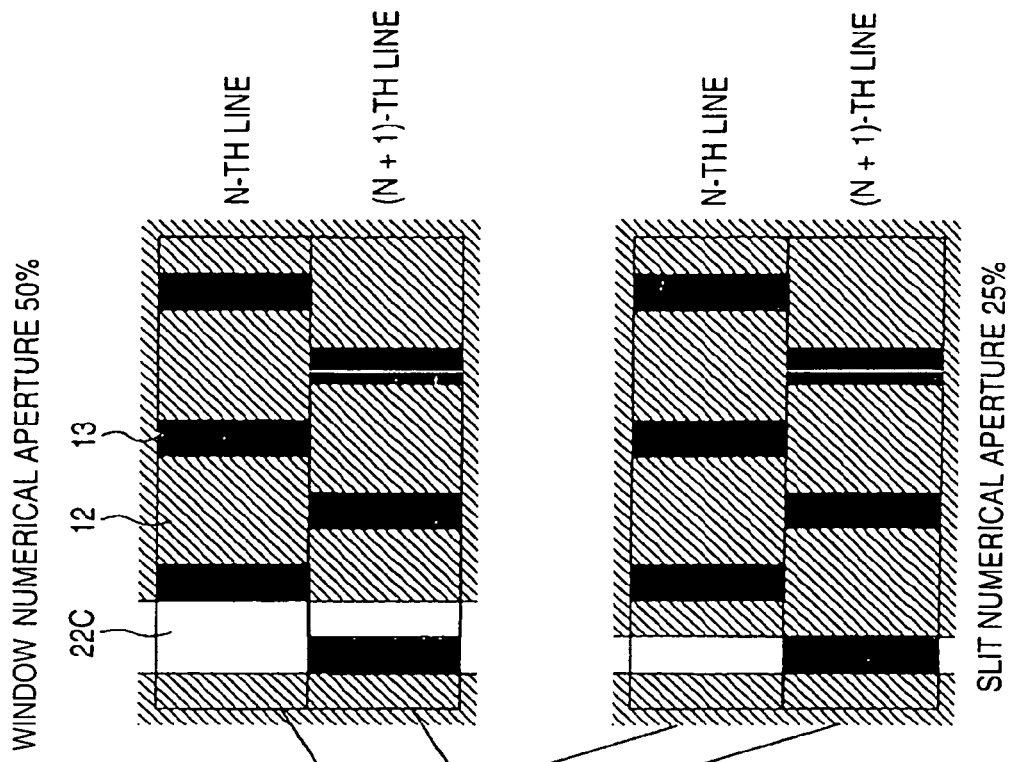
FIGS. 10A to 10C are plan views schematically showing change in luminance and arrangement of windows relative to two-dimensional image display pixels in the three-dimensional image display device depicted in FIGS. 3A and 3B in the case where the positions of the windows relative to the two-dimensional image display pixels are shifted in accordance with each line.

FIGS. 5A, 5B, 6A, 6B, 7A and 7B have shown the case where the horizontal numerical aperture in the display unit is changed. The influence of change in horizontal width of each window of the mask will be described below with reference to and FIGS. 10A to 10C, 11A to 11C, 12A to 12C and 13A to 13C. FIG. 10A is a graph showing change in luminance in the case where two-dimensional image display pixels having a horizontal numerical aperture of 75% (hp_h×0.75) are combined with a mask formed in such a manner that the horizontal width of each window is 50% or 25% (hp_h×0.50, hp_h×0.25) as large as the pitch of the two-dimensional image display pixels. FIG. 10B is a plan view showing the arrangement relation between the mask 20 having windows 22C with a horizontal width of 50%, and the two-dimensional image display pixels 12 and the BM 13. Similarly, FIG. 10C is a plan view showing the arrangement relation between the mask 20 having windows 22C with a horizontal width of 25%, and the two-dimensional image display pixels 12 and the BM 13. As shown in FIGS. 10B and 10C, each window 22C extends vertically and has a predetermined shape in horizontal position. The BM 13 is arranged in boundaries between the two-dimensional image display pixels 12 on the N-th line in the display unit 10. The (N+1)-th two-dimensional image display pixel line is arranged relative to the N-th two-dimensional image display pixel line so that the phase is shifted by a half of the width (hp_h×0.50) of each two-dimensional image display pixel 12. FIG. 10C shows the same relation as in FIG. 5B, so that the description of FIG. 10C will be omitted. FIG. 10B in which the horizontal width of each window of the mask is increased compared with FIG. 10C will be described below. In the arrangement shown in FIG. 10B, cyclic change in luminance as represented by the reference symbols Bn1 and Bn2 in FIG. 10A occurs on the N-th and (N+1)-th two-dimensional image display pixel lines through the window 22C having a horizontal width of 50%. The N-th line and the (N+1)-th line are disposed so that the phase of moiré caused by cyclic change in luminance is shifted by a half of the moiré generation period. Moreover, the waveforms of luminance on the N-th and (N+1)-th lines are substantially equal to each other because the horizontal numerical aperture of the window is set at 50%. Moreover, the phases of the waveforms are different by a half phase. Accordingly, when the N-th and (N+1)-th lines are observed simultaneously from a single window, the cyclic change of luminance on both lines is averaged as represented by {N-th line+(N+1)-th line}/2 so that change in luminance is substantially eliminated so as to be substantially equalized as represented by the reference symbol Bn3. That is, even in the case where the two-dimensional image display pixels are observed from the observation side through any window 22C, constant luminance can be obtained. Accordingly, moiré can be eliminated, so that the most ideal display can be obtained.

Figure 11B:
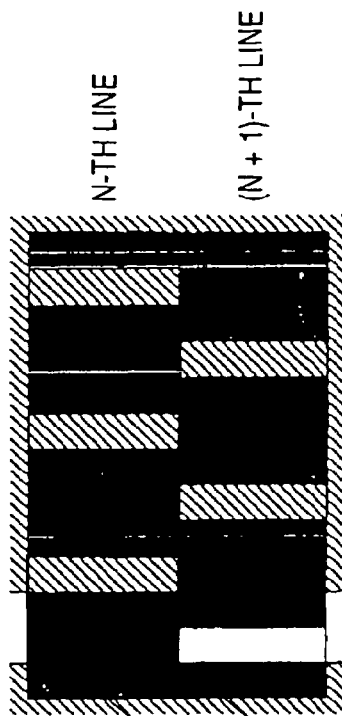
FIGS. 11A to 11C are plan views schematically showing change in luminance and arrangement of windows relative to two-dimensional image display pixels in the three-dimensional image display device depicted in FIGS. 3A and 3B in the case where the positions of the windows relative to the two-dimensional image display pixels are shifted in accordance with each line.
Figure 11C:
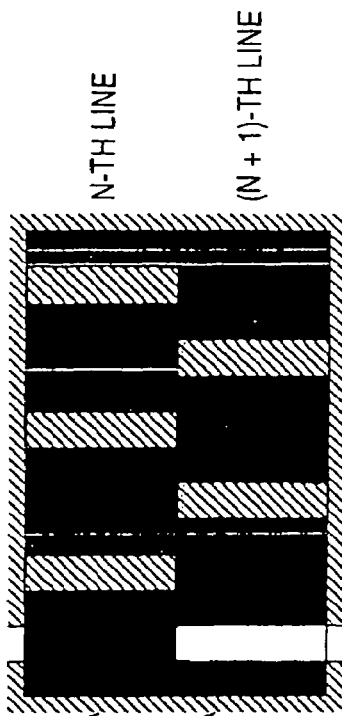
Figure 11A:
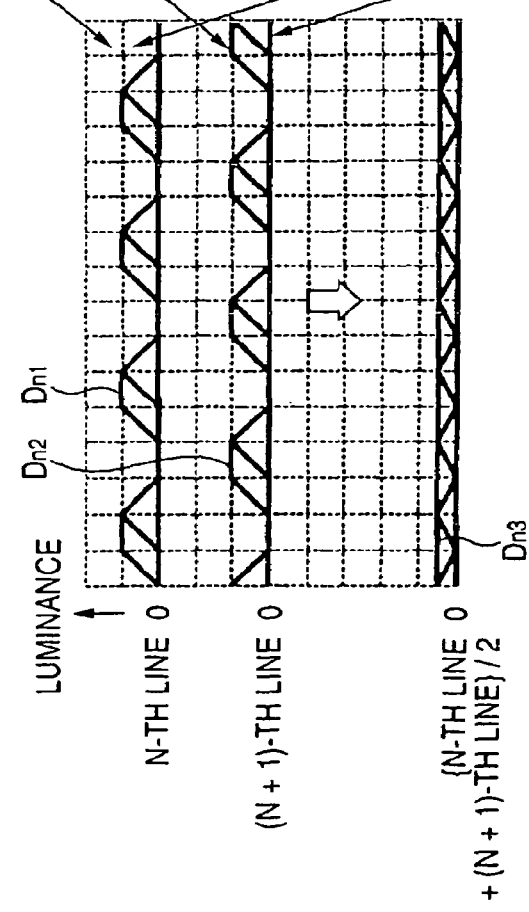

FIG. 11A is a graph showing change in luminance in the case where two-dimensional image display pixels having a horizontal numerical aperture of 25% are combined with a mask formed in such a manner that the horizontal width of each window is 50% or 25% (hp_h×0.50, hp_h×0.25) as large as the pitch of the two-dimensional image display pixels. FIG. 11B is a plan view showing the arrangement relation between the mask 20 having windows 22C with a horizontal width of 50%, and the two-dimensional image display pixels 12 and the BM 13. Similarly, FIG. 11C is a plan view showing the arrangement relation between the mask 20 having windows 22C with a horizontal width of 25%, and the two-dimensional image display pixels 12 and the BM 13.

As shown in FIGS. 11B and 11C, the (N+1)-th two-dimensional image display pixel line is arranged relative to the N-th two-dimensional image display pixel line so that the phase is shifted by a half of the width of each two-dimensional image display pixel 12. FIG. 11C shows the same relation as in FIG. 7B, so that the description of FIG. 11C will be omitted. FIG. 11B in which the horizontal width of each window of the mask is increased compared with FIG. 11C will be described below. In the arrangement shown in FIG. 11B, cyclic change in luminance as represented by the reference symbols Dn1 and Dn2 in FIG. 11A occurs on the N-th and (N+1)-th two-dimensional image display pixel lines through the window 22C having a horizontal width of 50%. The N-th line and the (N+1)-th line are disposed so that the phase of moiré caused by cyclic change in luminance is shifted by a half of the moiré generation period. Moreover, the waveforms of luminance on the N-th and (N+1)-th lines are substantially equal to each other because the horizontal numerical aperture of the window is set at 50%. Moreover, the phases of the waveforms are different by a half phase. Accordingly, when the N-th and (N+1)-th lines are observed simultaneously from a single window, the cyclic change of luminance on both lines is averaged as represented by (N-th line+(N+1)-th line)/2 so that change in luminance is substantially eliminated so as to be substantially equalized as represented by the reference symbol Dn3. That is, even in the case where the two-dimensional image display pixels are observed from the observation side through any window 22C, constant luminance can be obtained. Accordingly, moiré can be eliminated, so that the most ideal display can be obtained. FIGS. 10A to 10C and FIGS. 11A to 11C have shown the case where the horizontal width of each window provided in the mask becomes large. The case where the horizontal width is small will be described below with reference to FIGS. 12A to 12C and FIGS. 13A to 13C.

FIG. 12A is a graph showing change in luminance in the case where two-dimensional image display pixels having a horizontal numerical aperture of 75% (hp_h×0.75) are combined with a mask formed in such a manner that the horizontal width of each window is infinitely small or 25% (hp_h×1/∞, hp_h×0.25) as large as the pitch of the two-dimensional image display pixels. FIG. 12B is a plan view showing the arrangement relation between the mask 20 having windows 22C with an infinitely small horizontal width, and the two-dimensional image display pixels 12 and the BM 13. Similarly, FIG. 12C is a plan view showing the arrangement relation between the mask 20 having windows 22C with a horizontal width of 25%, and the two-dimensional image display pixels 12 and the BM 13. The windows 22C with a horizontal width of 0% may be applied to the case where focal points of lenticular sheet are set on a plane of the two-dimensional image display pixels in the condition that the lenticular sheet are used as the windows 22. The term "horizontal width of 0%" means an infinitely small numerical aperture and includes the case where the horizontal width is substantially 0%.

As shown in FIGS. 12B and 12C, the (N+1)-th two-dimensional image display pixel line is arranged relative to the N-th two-dimensional image display pixel line so that the phase is shifted by a half of the width of each two-dimensional image display pixel 12. FIG. 12C shows the same relation as in FIG. 5B, so that the description of FIG. 12C will be omitted. FIG. 12B in which the horizontal width of each window of the mask is decreased compared with FIG. 12C will be described below. In the arrangement shown in FIG. 12B, cyclic and rectangular wave-like change in luminance as represented by the reference symbols Fn1 and Fn2 in FIG. 12A occurs on the N-th and (N+1)-th two-dimensional image display pixel lines through the window 22C having a horizontal width of 0%. The N-th line and the (N+1)-th line are disposed so that the phase of moiré caused by cyclic and rectangular wave-like change in luminance is shifted by a half of the moiré generation period. Accordingly, when the N-th and (N+1)-th lines are observed simultaneously from a single window, the cyclic change of luminance on both lines is averaged as represented by {N-th line+(N+1)-th line}/2 so that change in luminance is reduced to half so as to be equalized while the period in change of luminance is increased to twice as represented by the reference symbol Fn3.

Figure 13B:
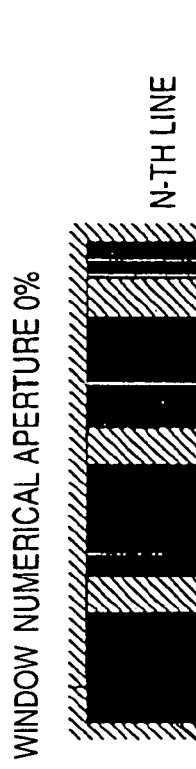
FIGS. 13A to 13C are plan views schematically showing change in luminance and arrangement of windows relative to two-dimensional image display pixels in the three-dimensional image display device depicted in FIGS. 3A and 3B in the case where the positions of the windows relative to the two-dimensional image display pixels are shifted in accordance with each line.
Figure 13C:
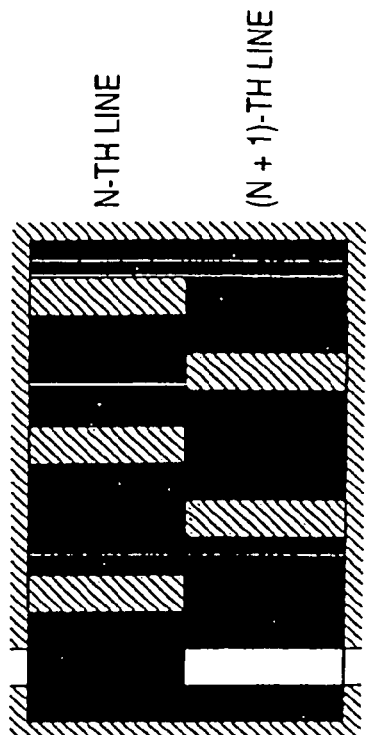
Figure 13A:
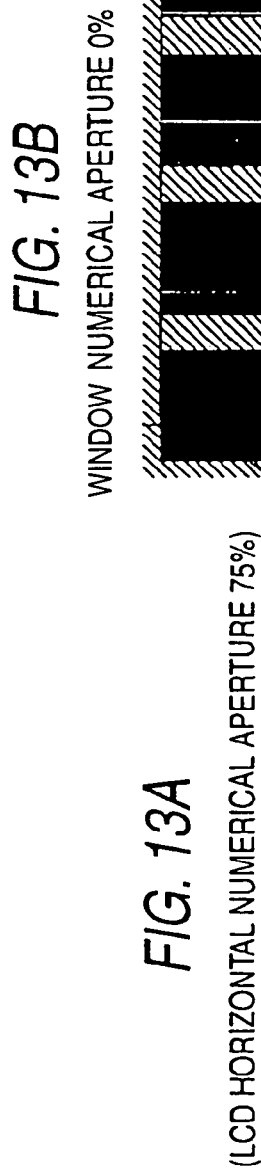
Figure 15B:
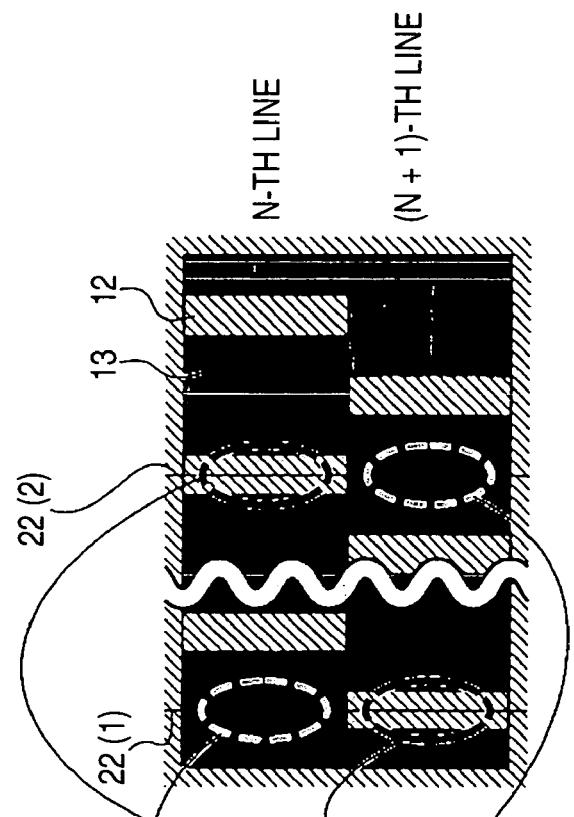
FIGS. 15A to 15B are plan views schematically showing change in luminance and arrangement of windows relative to two-dimensional image display pixels in the three-dimensional image display device depicted in FIGS. 3A and 3B in the case where the positions of the windows relative to the two-dimensional image display pixels are shifted in accordance with each line and adjacent windows.
Figure 15A:
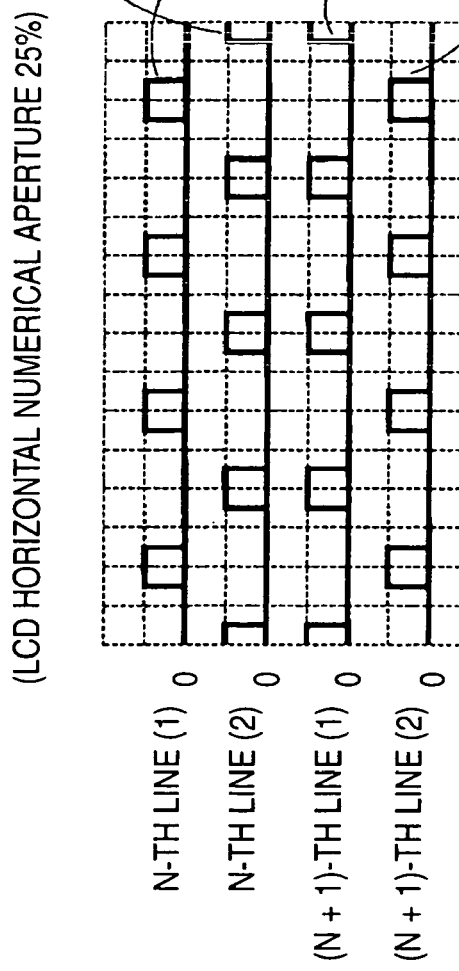

FIG. 13A is a graph showing change in luminance in the case where two-dimensional image display pixels having a horizontal numerical aperture of 25% (hp_h×0.25) are combined with a mask formed in such a manner that the horizontal width of each window is infinitely small or 25% (hp_h×1/∞, hp_h×0.25) as large as the pitch of the two-dimensional image display pixels. FIG. 13B is a plan view showing the arrangement relation between the mask 20 having windows 22C with an infinitely small horizontal width, and the two-dimensional image display pixels 12 and the BM 13. Similarly, FIG. 13C is a plan view showing the arrangement relation between the mask 20 having windows 22C with a horizontal width of 25%, and the two-dimensional image display pixels 12 and the BM 13.

As shown in FIGS. 13B and 13C, the (N+1)-th two-dimensional image display pixel line is arranged relative to the N-th two-dimensional image display pixel line so that the phase is shifted by a half of the width of each two-dimensional image display pixel 12. FIG. 13C shows the same relation as in FIG. 7B, so that the description of FIG. 13C will be omitted. FIG. 13B in which the horizontal width of each window of the mask is decreased compared with FIG. 13C will be described below. In the arrangement shown in FIG. 13B, cyclic and rectangular wave-like change in luminance as represented by the reference symbols Hn1 and Hn2 in FIG. 13A occurs on the N-th and (N+1)-th two-dimensional image display pixel lines through the window 22C having a horizontal width of 0%. The N-th line and the (N+1)-th line are disposed so that the phase of moiré caused by cyclic and rectangular wave-like change in luminance is shifted by a half of the moiré generation period. Accordingly, when the N-th and (N+1)-th lines are observed simultaneously from a single window, the cyclic change of luminance on both lines is averaged as represented by {N-th line+(N+1)-th line}/2 so that change in luminance is reduced to half so as to be equalized while the period in change of luminance is increased to twice as represented by the reference symbol Hn3.

As is obvious from the above description with reference to FIGS. 10A to 10C and FIGS. 11A to 11C, when the horizontal width of each window of the mask is changed from 25% to 50% as large as the pixel pitch in the display unit, moiré can be suppressed even in the case where the numerical aperture in the display unit is 25% or 75%.

When the horizontal width of each window 22C of the mask 20 is reduced or set at an infinitely small value as shown in FIGS. 12A to 12C and FIGS. 13A to 13C, change in luminance of moiré becomes so acute that moiré can be visually recognized easily. However, when the two-dimensional image display pixels in the display unit are arranged in delta arrangement, the period of moiré can be increased to twice and change in luminance can be reduced to half to thereby make moiré inconspicuous.

From the consideration of the aforementioned points, the following facts can be deduced.

(a) There is no occurrence of moiré in the two-dimensional image display pixels having a horizontal numerical aperture of 50% and arranged in delta arrangement.

(b) There is no occurrence of moiré when the horizontal width of each window of the mask is set at 50% in the case where the two-dimensional image display pixels are arranged in delta arrangement.

(c) When the two-dimensional image display pixels are arranged in delta arrangement in the case where the condition (a) or (b) is not satisfied, the period of moiré is increased to twice and contrast of moiré is reduced to half to thereby make moiré inconspicuous.

(d) When the horizontal numerical aperture of the two-dimensional image display pixels is reduced in the case where the condition (a) or (b) is not satisfied, contrast of moiré is increased to make moiré conspicuous.

Although a system in which only horizontal parallactic information is given in the condition that the two-dimensional image display pixels are arranged so that the phase is shifted by a half of the pitch (hp_h×0.50) of the two-dimensional image display pixels has been described above, a system in which only horizontal parallactic information is given is generalized as follows.

(a) When the horizontal numerical aperture of the two-dimensional image display pixels arranged while the positions of the two-dimensional image display pixels are shifted by hp_h×h/a horizontally is set at hp_h×h/a×n (in which n is an integer), moiré can be prevented regardless of the horizontal width of each window of the mask.

(b) When the horizontal width of each window of the mask is set at hp_h×h/a×n (in which n is an integer) in the case where the two-dimensional image display pixels are arranged while the positions of the two-dimensional image display pixels are shifted by P×h/a horizontally, moiré can be prevented regardless of the horizontal numerical aperture of the two-dimensional image display pixels.

(c) When the horizontal positions of the two-dimensional image display pixels are shifted by hp_h×h/a in the case where the condition (a) or (b) is not satisfied, contrast of moiré is reduced to h/a while the period of moiré is increased to a/h times to thereby make moiré inconspicuous.

(d) When the horizontal numerical aperture of the two-dimensional image display pixels is increased in the case where the condition (a) or (b) is not satisfied, contrast of moiré is reduced to thereby make moiré inconspicuous.

Here, n is an integer. This is described because the moiré suppressing effect can be kept even in the case where (a) the horizontal numerical aperture of the two-dimensional image display pixels in the display unit or (b) the horizontal width of each window of the mask is set at an integer multiple of hp_h×h/a. That is, in the one-dimensional IP technique, when a/h lines are regarded as one region in the condition that the same positional relation is generated by every a/h lines because the center positions of pixels are shifted by h/a, this condition is equivalent to the condition that vertical resolution is reduced to h/a times while horizontal resolution is increased to a/h times. A state in which the rate of the opening portions of the pixels to the non-opening portions of the pixels after the replacement is 50% is equivalent to (a). A state in which windows are provided so that the rate of the opening portions of the pixels to the non-opening portions of the pixels is set at 50% in the case where the rate is not 50% is equivalent to (b). Repetitively speaking, moiré can be eliminated when the width of the window or the horizontal numerical aperture of the pixels is controlled so that the rate of the opening portions to the BM observed through the window is kept constant in view from any position. Really, (a) and (b) are general relations which hold even in the case of h=a (that is, a striped arrangement array in which the horizontal positions of the two-dimensional image display pixels are not shifted).

Although controlling the horizontal numerical aperture of the two-dimensional image display pixels or controlling the horizontal width of each window of the mask to satisfy the condition (a) or (b) is effective, it is difficult to control these strictly. For example, in most cases, the horizontal numerical aperture of the pixels in the display unit is affected by a lot of factors such as array design, resolution, etc. It is undesirable to change the design for the single reason on the three-dimensional image display device side. On the other hand, the width of each window of the mask is affected by a lot of factors such as diffraction effect and viewing distance in the case of windows and the problem of aberration in the case of lenses. Each of these factors becomes a barrier to the attempt to control the width of each window of the mask evenly in the display surface. Dispersing remaining moiré by the methods (c) and (d) using the windows in addition to (a) and (b) or in the case where (a) and (b) cannot be achieved is effective. Combining (2) phase shift in parallactive direction as a further dispersing method with these methods is effective. In (2) phase shift in parallactic direction, there is used a method in which windows adjacent to each other in a parallax-donating direction are provided so that the positions of the two-directional image display pixels relative to the windows 22 are shifted to thereby shift the position of occurrence of window moiré. Although phase shift is performed between adjacent windows by this method, phase shift may be performed between regions each composed of a plurality of windows. When the positions of the two-dimensional image display pixels relative to the windows 22 are changed cyclically, the position of occurrence of moiré can be shifted in the same manner as in (1) phase shift in non-parallactic direction.

FIGS. 14A and 14B and FIGS. 15A and 15B show luminance distribution and arrangement of the positions of the two-dimensional image display pixels relative to the windows 22 in the one-dimensional IP technique in the case where adjacent windows are provided so that the horizontal positions of the two-dimensional image display pixels relative to the windows 22 are shifted by a half of the horizontal pitch of the two-dimensional image display pixels (hp_h× 0.50). In the embodiment shown in FIGS. 14A and 14B, the horizontal numerical aperture of the two-dimensional image display pixels is 75%. In the embodiment shown in FIGS. 15A and 15B, the horizontal numerical aperture of the two-dimensional image display pixels is 25%. In these embodiments, the horizontal width of each window provided in the mask is set at 0%. As described above, because this condition is not fit for (a) and (b), this is a system in which moiré is visually recognized if (1) phase shift in non-parallactic direction or (2) phase shift in parallactic direction which will be described in this paragraph is not applied. Description will be made with reference to FIGS. 14A and 14B representatively. As shown in FIG. 14B, the windows 22(1) and 22(2) extend vertically so that the horizontal positions of the windows 22(1) and 22(2) are kept constant. The BM 13 is arranged between the two-dimensional image display pixels 12 on the N-th line in the display unit 10. The (N+1)-th two-dimensional image display pixel line is disposed relative to the N-th two-dimensional image display pixel line so that the phase is shifted by a half of the width of each two-dimensional image display pixel 12. On the N-th line, the first window 22(1)

substantially faces the center of the two-dimensional image display pixel 12 whereas the second window 22(2) adjacent to the first window 22(1) faces the BM 22(2). On the (N+1)-th line, the second window 22(2) substantially faces the center of the two-dimensional image display pixel 12 whereas the first window 22(1) adjacent to the second window 22(2) faces the BM 22(1). That is, the window pitch is not set at an integer multiple of the two-dimensional image display pixel but set at a value obtained by adding a half width of the two-dimensional image display pixel to an integer multiple of the two-dimensional image display pixel.

As shown in FIG. 14A, change in luminance on the N-th line as represented by the reference symbol Kn(1) is generated by the first window 22(1) while change in luminance on the (N+1)-th line as represented by the reference symbol Kn+1 (1) is generated by the first window 22(1) so as to be shifted by phase π from the luminance change Kn(1). Similarly, change in luminance on the N-th line as represented by the reference symbol Kn(2) is generated by the second window 22(2) while change in luminance on the (N+1)-th line as represented by the reference symbol Kn+1 (2) is generated by the second window 22(2) so as to be shifted by phase π from the luminance change Kn(2). In other words, the windows 22(1) and 22(2) adjacent to each other are provided so that the phase of occurrence of moiré is shifted by near phase π as well as the N-th and (N+1)-th lines adjacent to each other are provided so that the period of occurrence of moiré is shifted by phase π. The term "near phase ρ" means that the value for shifting the period of occurrence of moiré is slightly different from π because change in luminance shifted by (½+α) due to the gap between the panel and the window is observed by the observer even in the case where the phase is designed to be shifted by a half of the horizontal pitch of the two-dimensional image display pixels. When the positional relation is set thus, moiré with a visually recognized width is generated with reverse phases on the adjacent windows. Accordingly, the moiré canceling effect increases more greatly in addition to (1) phase shift in non-parallactic direction, so that moiré can be perfectly prevented from being visually recognized. Although description has been made with reference to FIGS. 14A and 14B, moiré dispersion can be made in the configuration shown in FIG. 15B in the same manner as described above (FIG. 15A). Although a system using both (1) phase shift in non-parallactic direction and (2) phase shift in parallactic direction has been described with reference to FIGS. 14A and 14B and FIGS. 15A and 15B, the effect of changing the period of moiré to i/b times and changing the contrast of moiré to i/b times can be obtained also in the case where only (2) phase shift in parallactic direction is used. In this case, however, the moiré fringes per se are still vertically continuous, so that the moiré fringes are apt to be visually recognized compared with the case where only (1) is used. In this case, when the head moves horizontally, flickering of lenses or parallax windows is visually recognized, undesirably.

Incidentally, when (2) is achieved, the pitch of the windows of the mask is not set at an integer multiple of the pitch (P) of the two-dimensional image display pixels. This may be supposed to be out of the definition (light rays constituting a three-dimensional image are parallel to one another) in the IP technique. However, the fact that the pitch of the windows of the mask is set, for example, at hp_h×(m+j/b) (in which j/b is a shift value in a parallactic direction) means the fact that the same relation between the windows and the two-dimensional image display pixels appears by every b/i windows, that is, the fact that light rays for forming element images by every b/i are parallel to one another.

Figure 29:
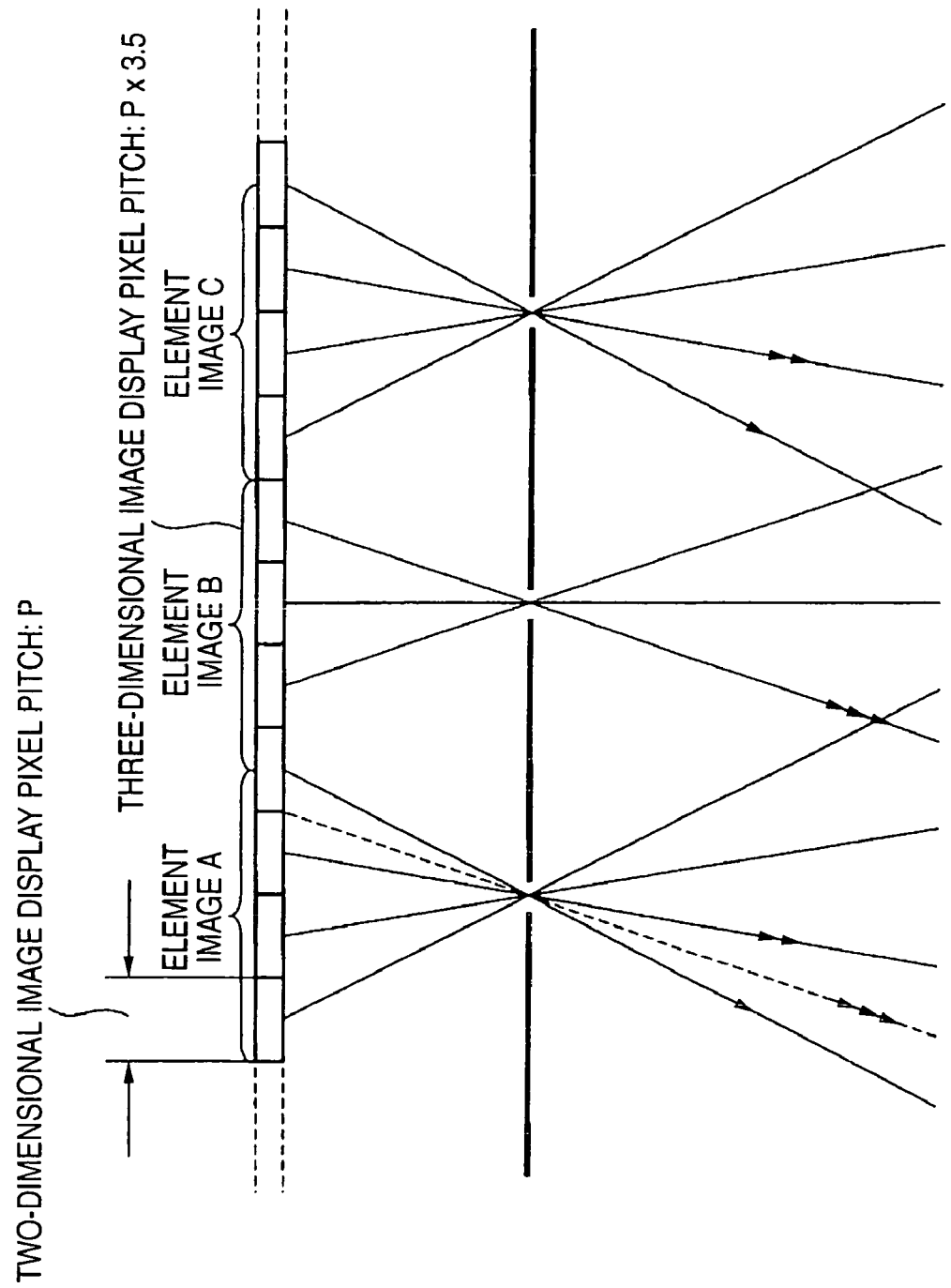
FIG. 29 is a view for explaining an IP technique in which the pitch of the windows is selected to be different from an integer multiple of the pitch of the two-dimensional image display pixels.

FIG. 29 is an explanatory conceptual view. In FIG. 29, one element image is constituted by (3+½) two-dimensional image display sub pixels. As a result, element images in which light rays are parallel to each other are generated at intervals of every two windows (element images A and C). Moreover, it is obvious that the loci of light rays connecting the window for the element image B to the center of the two-dimensional image display pixel are located among a group of light rays for the element image A as represented by the broken line among the group of light rays. That is, the fact that the positions of the pixels relative to the windows are shifted by j/b means the fact that the camera interval for performing photographing by parallel projection is increased to b/i times. This can be also applied to (1) phase shift in non-parallactic direction. That is, the fact that the position of occurrence of moiré (the locus of absence of light rays connecting the BM to the windows) is dispersed is equivalent to the fact that the photographing direction is dispersed. Accordingly, if the degree of moiré dispersion is to be improved, the number of photographing directions increases. It is not easy to disperse moiré. As a method for dispersing the position of occurrence of moiré effectively while suppressing increase in number of photographing directions, there is a method in which the shift value in (1) phase shift in non-parallactic direction and the shift value in (2) phase shift in parallactic direction are made equal to each other. That is, in the case of a/h=b/i, the photograph positions are only increased to h/a times. In the case of a/h≠b/i, the photograph positions are increased by a/h×b/i. When the degree of moiré dispersion and the increase of the photograph positions are considered, it is not significant to set a or b at a value larger than 6. Specifically, the degree of moiré dispersion cannot be improved compared with increase in load on increase of the photograph positions. From the above description, combination of the method of (1) with the method of (2) is effective in dispersing moiré, that is, in dispersing display inhibition caused by the non-display portions of the display unit 10. When the method of (1) and further the method of (2) are combined with the IP technique, the non-display portions can be dispersed effectively to make the moiré fringes inconspicuous regardless of the horizontal numerical aperture of the two-dimensional image display pixels in the display unit and the horizontal width of each window of the mask. Although the number of places of occurrence of moiré changes in accordance with the viewing distance, moiré can be dispersed into the display surface in any case.

The aforementioned moiré dispersion will be described qualitatively with reference to FIGS. 8A to 8F and FIGS. 9A to 9F. In FIGS. 8A to 8F and FIGS. 9A to 9F, lenticular lenses 22B extending vertically are used as the windows 22. FIGS. 8A to 8F show the case where a display unit having a horizontal numerical aperture of 75% is used as the display unit 10. FIGS. 9A to 9F show the case where a display unit having a horizontal numerical aperture of 50% is used as the display unit 10. A vertically long rectangle expresses a lens or a set of lenses for convenience' sake. The lens can be generalized on the assumption that the number of lenses constituting the vertically long rectangle varies according to the viewing distance. Assume that the focusing of the lens is set on the display unit surface.

Figure 8A:
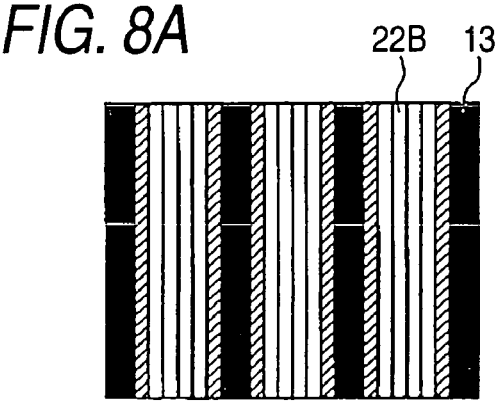

When the horizontal positions of two-dimensional image display pixels 12 on the N-th line coincide with the horizontal positions of two-dimensional image display pixels on the (N+1)-th line on the display surface of the display unit 10, lenses in which the BM portions appear through the lenticular lenses 22B are generated cyclically as shown in FIG. 8A. They are visually recognized as moiré fringes.

On the contrary, when the lenticular lenses 22B are phase-shifted by a half (=i/b) of the width of each two-dimensional image display pixel 12 from the arrangement on the display surface in which the horizontal positions of the two-dimensional image display pixels 12 on the N-th line coincide with the horizontal positions of the two-dimensional image display pixels 12 on the (N+1)-th line on the display surface of the display unit 10 as shown in FIG. 8A, the BM portions are visually recognized as fringes through the lenticular lenses 22B as shown in FIG. 8B. Incidentally, the position where reduction in luminance occurs is shifted by a half of the moiré generation period from the state shown in FIG. 8A.

Accordingly, when the pitch of the windows in the display unit in the state shown in FIG. 8A is increased by a half (=i/b) of the pitch of the two-dimensional image display pixels while adjacent lenses (or adjacent regions each composed of a plurality of lenses) are provided so that the positions of the centers of the lenses relative to the two-dimensional image display pixels are shifted by a half (=i/b), this condition is substantially equivalent to the case where moiré in the state shown in FIG. 8A or moiré in the state shown in FIG. 8B is generated if lenses (or regions each composed of a plurality of lenses) at intervals of every two (=b/i) lenses (or regions each composed of a plurality of lenses) are considered. Consequently, moiré is dispersed in the state shown in FIG. 8C (the frequency of moiré is increased to twice and the contrast of moiré is reduced to half).

Figure 8D:
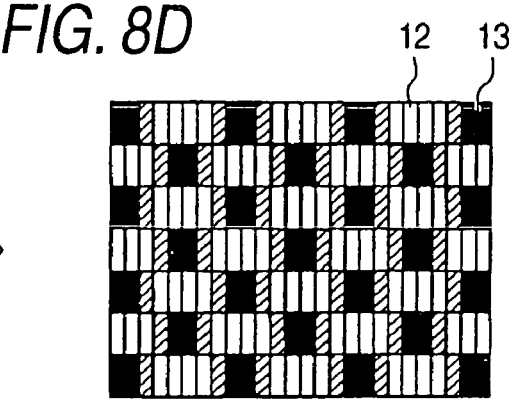
Figure 8D:
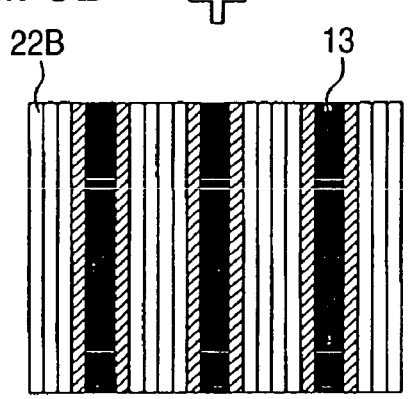
Figure 8D:
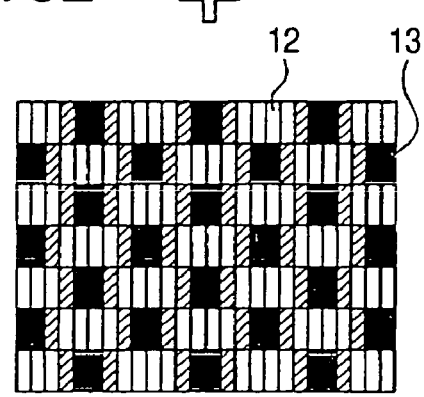
Figure 8C:
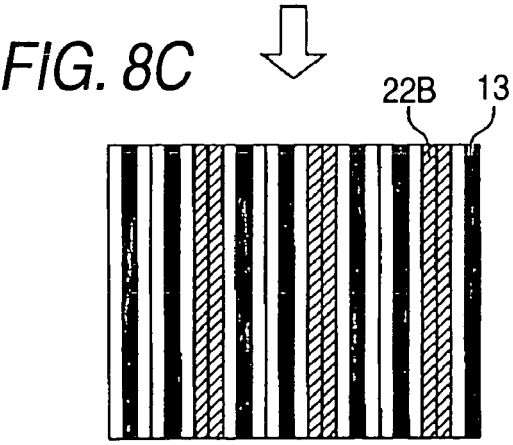
Figure 8F:
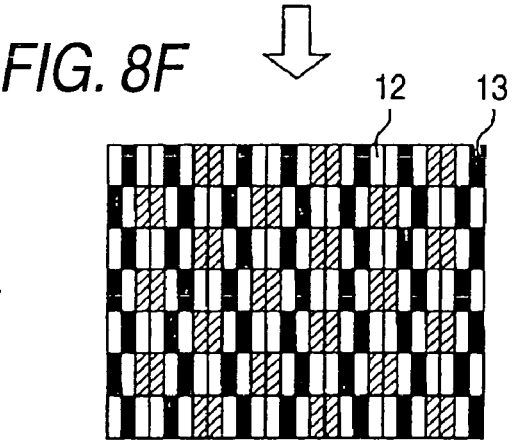
Figure 9A:
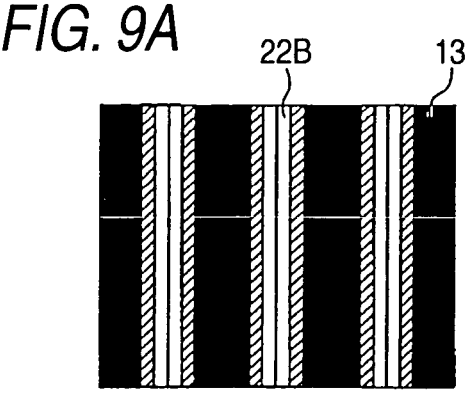
FIGS. 9A to 9F are pattern views for explaining combination of phase shift in a parallactic direction and phase shift in a non-parallactic direction with respect to the dispersion of moiré shown in FIGS. 5A and 5B, FIGS. 6A and 6B and FIGS. 7A and 7B.
Figure 9D:
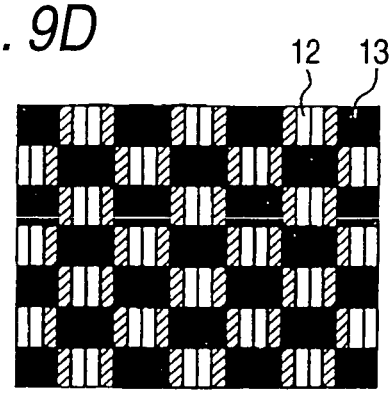
Figure 9B:
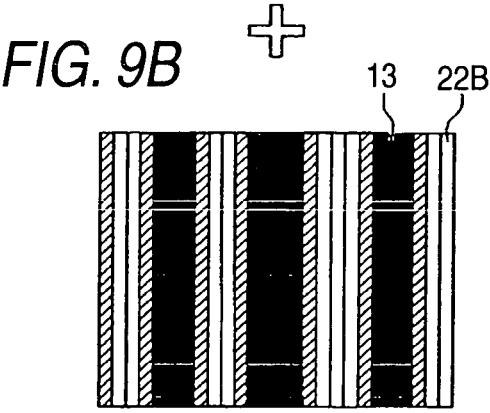
Figure 9E:
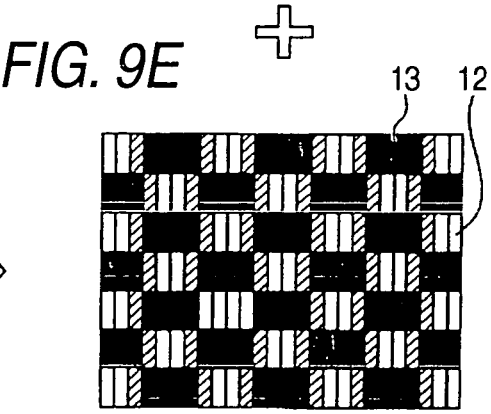
Figure 9C:
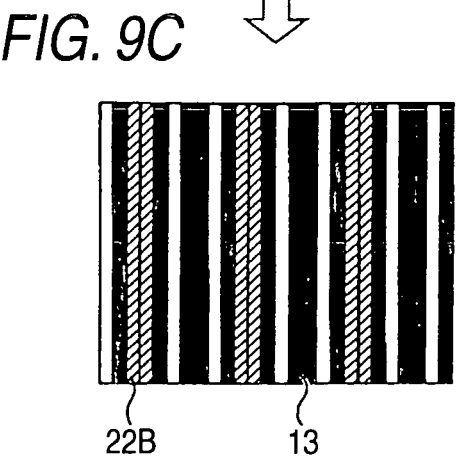
Figure 9F:
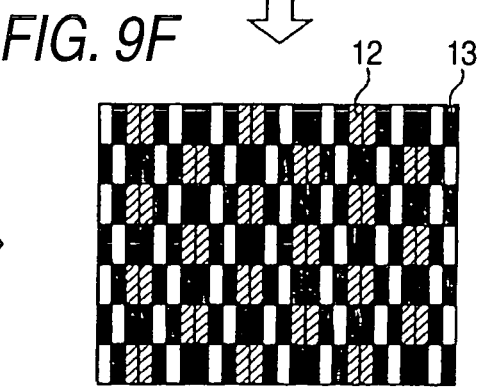

FIG. 8F shows the case where shift (phase shift in non-parallactic direction) of the horizontal positions of the two-dimensional image display pixels in the display unit is combined with the state shown in FIG. 8C. That is, when the two-dimensional image display pixels 12 on the N-th line (or the region N composed of a plurality of lines) and the two-dimensional image display pixels 12 on the (N+1)-th line (or the region N+1 composed of a plurality of lines) on the display surface of the display unit 10 are arranged so that the phase is shifted by a half (=h/a) of the width of each two-dimensional image display pixel 12, the position of occurrence of moiré dispersed by (2) phase shift in parallactic direction can be shifted by the combination of these lines (or these regions) as shown in FIG. 8F. Although FIG. 8F shows the case where the position of occurrence of moiré is shifted in accordance with each line (or each region) on the assumption that the pitch of the lines (or the regions) is large to a certain degree, moiré may be visually recognized so that the frequency of moiré is increased to twice and the contrast of moiré is reduced to half compared with FIG. 8C when the pitch is averaged to become small.

On the other hand, a flow of FIG. 8A→FIG. 8D+FIG. 8E→FIG. 8F shows change in the position of occurrence of moiré in the case where (1) phase shift in non-parallactic direction and (2) phase shift in parallactic direction are combined in such reverse order that (1) is executed before (2) is executed. In any case, moiré in the state shown in FIG. 8F occurs finally.

FIGS. 9A to 9F qualitatively show the case where the horizontal numerical aperture of the pixels is changed. It is obvious that moiré can be dispersed effectively by the combination of (1) phase shift in non-parallactic direction and (2) phase shift in parallactic direction though the horizontal numerical aperture is changed.

According to the aforementioned experimental result, in the IP technique, (1) phase shift in non-parallactic direction is effective in dispersing moiré, and moiré can be dispersed more sufficiently when (2) phase shift in parallactic direction is added to (1). Moiré cannot be dispersed only by (2). In the case where (1) and (2) are combined, increase in the image acquiring direction can be suppressed when the quantity of change in the positions of the two-dimensional image display pixels of the display unit relative to the windows of the mask in (1) is made equal to that in (2). It is however realistic that increase in the image acquiring direction is limited within five times as large as the original state even when increase in the image acquiring direction is made. According to the aforementioned method, reduction in luminance caused by the non-display portions is dispersed evenly and continuously even in the case where the observer moves left and right (and up and down in the case of the two-dimensional IP technique). The horizontal numerical aperture (and vertical numerical aperture in the case of the two-dimensional IP technique) of the two-dimensional image display pixels of the display unit 10 and the horizontal width (and vertical width in the case of the two-dimensional IP technique) of each window of the mask can be designed independent of the design of the three-dimensional display. Although description has been made on the case where the positions of the two-dimensional image display pixels are shifted, the same effect as described above can be obtained also in the case where the positions of the windows 22 of the mask 20 are shifted. Although description has been made on the case where the shift value is set at a half of the pitch of the two-dimensional image display pixels (hp_h×0.50), the moiré dispersing effect can be obtained also in the case where the shift value is set at another value though the period of moiré may be changed. As described above, it is however preferable that the shift value is set at ½ or ⅓ when increase in the photograph direction and the phase shift value of moiré are considered. To avoid increase in the photograph direction, configuration may be made so that change in the positions of the two-dimensional image display pixels of the display unit relative to the windows of the mask is not reflected (for example, element images each formed by three pixels and element images each formed by four pixels are disposed alternately so that the directions of light rays for acquiring images can be kept when the pitch of the windows is set at 3.5P). In this case, quality of the three-dimensional image is however lowered. Also in the case where lowering of quality of the three-dimensional image is accepted, it is preferable that the shift value is set at ½ or ⅓. As is obvious from increase in image acquiring directions, (1) and (2) are effective in that the vertical resolution of the two-dimensional images observed when the observer views the three-dimensional image display device by one eye can be allocated to the horizontal resolution or horizontal parallactic number of the two-dimensional images. Accordingly, it is necessary to decide the shift values in (1) vertical phase shift and (2) phase shift in parallactic direction in consideration of balance in display performance of the three-dimensional image display device. Specifically, combining such phase shift with the one-dimensional IP technique is effective in keeping horizontal resolution because only horizontal resolution is sacrificed in the one-dimensional IP technique.

Finally, color moiré caused by such shift will be described additionally. When general vertical stripes CF are used in the display unit and combined with a mask having windows formed in such a manner that the horizontal positions of the windows are shifted cyclically as described above, BGB zones with a certain width are generated horizontally. This phenomenon is still a kind of moiré phenomenon caused by the cyclic structure of CF and the cyclic structure of the windows of the mask. Use of the display unit using CF arranged mosaically is effective in avoiding this phenomenon.

Various modifications of the aforementioned embodiment will be described below. That is, an embodiment of (1) phase shift in non-parallactic direction will be described with reference to FIGS. 17 to 23, an embodiment of (2) phase shift in parallactic direction will be described with reference to FIGS. 24 and 25, and an embodiment of combination of (1) phase shift in non-parallactic direction and (2) phase shift in parallactic direction will be described with reference to FIGS. 26 to 28. In the following description, only measures against moiré derived from signal lines in the one-dimensional IP (II without vertical parallactic information) technique using the display unit will be described. In the two-dimensional II technique, it is necessary to consider scanning lines. In FIGS. 16 to 28, there is shown an example in which stripe arrangement formed in such a manner that the horizontal positions of pixels of the same pitch on one column are equal to one another is used as arrangement of two-dimensional image display pixels on all lines on the display unit 10, and in which 16 (+j/b) pieces of parallax are given. One element image is constituted by 16 (+j/b) two-dimensional image display pixels.

Figure 16:
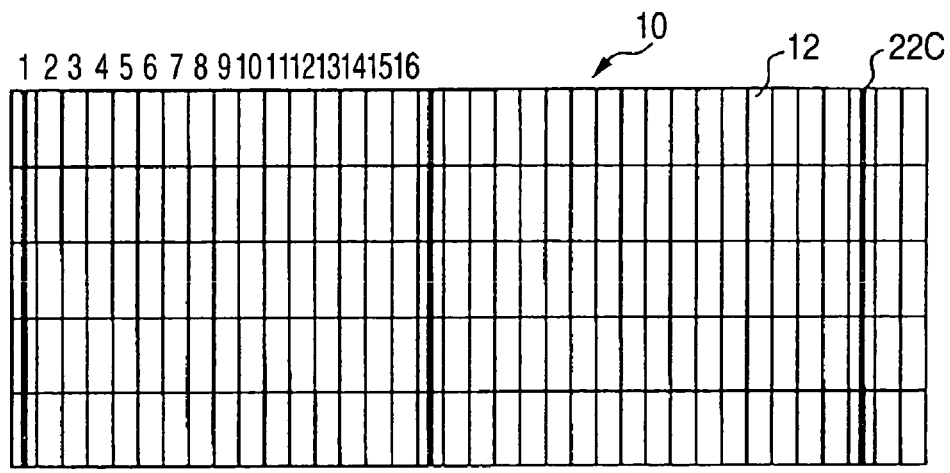
FIG. 16 is a plan view showing an example of arrangement of a mask and a display surface as a comparative example in which two-dimensional image display pixels are arranged on each line in the form of stripes, and windows extend vertically in the condition that the pitch of the windows is decided to be equal to an integer multiple of the pitch of the two-dimensional is image display pixels.

FIG. 16 shows conventional arrangement formed in such a manner that the positions of the two-dimensional image display pixels 12 relative to the windows 22 are constant, as a comparative example to make understanding easy. In FIG. 16, the windows 22C extend vertically through the near centers of corresponding two-dimensional image display pixels. The pitch of the windows 22C is kept equal to an integer multiple of the width of each two-dimensional image display pixel. Accordingly, moiré is generated because of the gap between each window 22 and the display unit 10.

Figure 17:
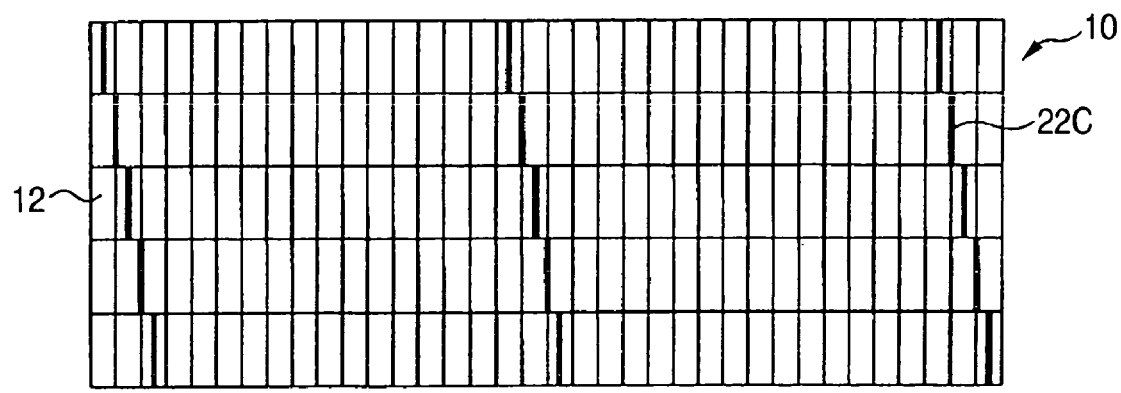
FIG. 17 is a plan view showing an example of arrangement of a mask and a display surface in the three-dimensional image display device according to an embodiment of the invention in which two-dimensional image display pixels are arranged on each line in the form of stripes, and the positions of windows relative to the two-dimensional image display pixels is shifted in accordance with each two-dimensional image display pixel line while the pitch of the windows is kept constant.

In FIG. 17, the positions of the windows 22C relative to the two-dimensional image display pixels are shifted by a half (h/a=½) of the width of each two-dimensional image display pixel whenever the two-dimensional image display pixel line increases. Accordingly, the window pitch is set at a value obtained by adding a half of the width of each two-dimensional image display pixel to an integer multiple of the width of each two-dimensional image display pixel. In the expression, $\underline{a}$ and $\underline{h}$ are integers and satisfy the relation h<a. The phase of occurrence of moiré is shifted by near π between two-dimensional image display pixel lines, so that the position of occurrence of moiré is dispersed. When the width of each line is sufficiently small, moiré in which the period is increased to twice and the contrast is reduced to half is visually recognized.

Figure 18:
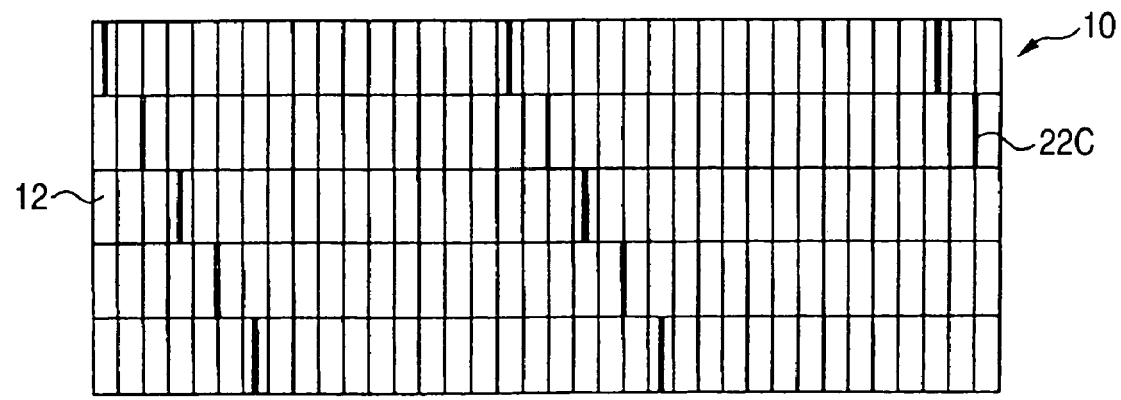
FIG. 18 is a plan view showing an example of arrangement of a mask and a display surface in the three-dimensional image display device according to an embodiment of the invention in which two-dimensional image display pixels are arranged on each line in the form of stripes, and the positions of windows relative to the two-dimensional image display pixels is shifted in accordance with each two-dimensional image display pixel line while the pitch of the windows is kept constant.

FIG. 18 shows another example in which the shift value of (h/a=½) is unchanged but the windows 22C are shifted by (1+h/a=3/2) whenever the two-dimensional image display pixel line increases. Also in this example, the phase of occurrence of moiré is shifted by near π between lines, so that the position of occurrence of moiré is dispersed. When the width of each line is sufficient small, moiré in which the period is increased to twice and the contrast is reduced to half is visually recognized.

Figure 19:
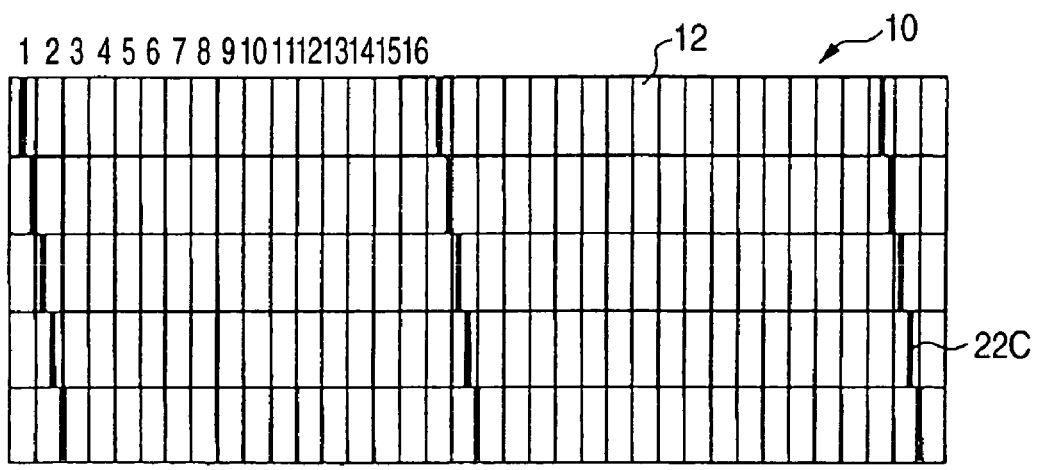
FIG. 19 is a plan view showing an example of arrangement of a mask and a display surface in the three-dimensional image display device according to an embodiment of the invention in which two-dimensional image display pixels are arranged on each line in the form of stripes, and the positions of windows relative to the two-dimensional image display pixels is shifted in accordance with each two-dimensional image display pixel line while the pitch of the windows is kept constant.

FIG. 19 shows another example in which the positions of the windows 22C relative to the two-dimensional image display pixels are shifted by (h/a=⅓) of the width of each two-dimensional image display pixel whenever the two-dimensional image display pixel line increases. That is, the widow pitch (hsp_h) is set at a value obtained by adding ⅓ of the width of each two-dimensional image display pixel to an integer multiple of the width of each two-dimensional image display pixel. Accordingly, the phase of occurrence of moiré is shifted by near (⅔)π between lines, so that the position of occurrence of moiré is dispersed. When the width of each line is sufficiently small, moiré in which the period is increased to three times and the contrast is reduced to ⅓ is visually recognized.

Figure 20:
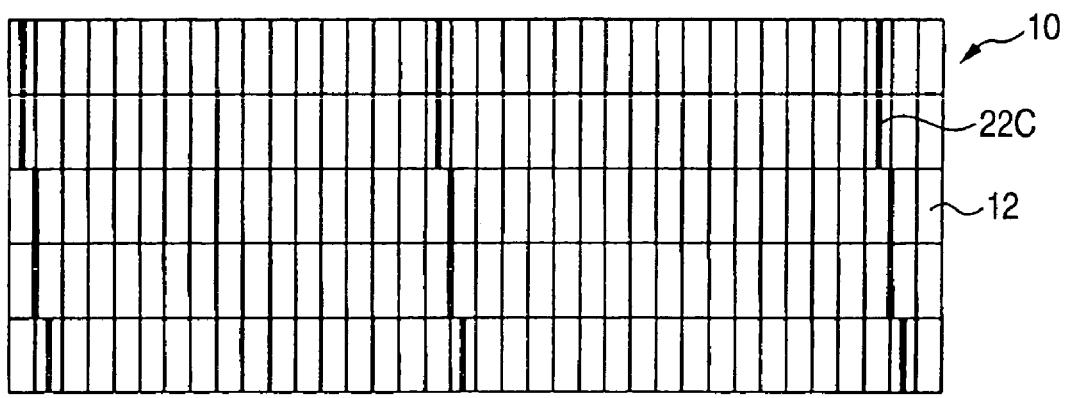
FIG. 20 is a plan view showing an example of arrangement of a mask and a display surface in the three-dimensional image display device according to an embodiment of the invention in which two-dimensional image display pixels are arranged on each line in the form of stripes, and the positions of windows relative to the two-dimensional image display pixels is shifted in accordance with each two-dimensional image display pixel line while the pitch of the windows is kept constant.

In FIG. 20, the positions of the windows 22C relative to the two-dimensional image display pixels are shifted by a half (h/a=½; $\underline{a}$ is an integer) of the width of each two-dimensional image display pixel whenever the two-dimensional image display pixel line increases by two lines. The phase of occurrence of moiré is shifted by near π between regions each composed of two lines, so that the position of occurrence of moiré is dispersed. When the width of every two lines is sufficiently small, moiré in which the period is increased to twice and the contrast is reduced to half is visually recognized.

Figure 21:
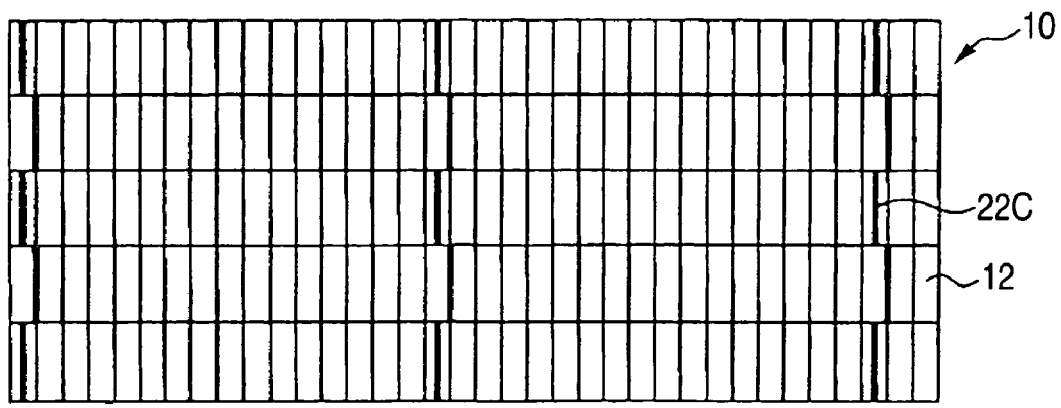
FIG. 21 is a plan view showing an example of arrangement of a mask and a display surface in the three-dimensional image display device according to an embodiment of the invention in which two-dimensional image display pixels are arranged on each line in the form of stripes, and the positions of windows relative to the two-dimensional image display pixels is shifted in accordance with each two-dimensional image display pixel line while the pitch of the windows is kept constant.

In FIG. 21, the positions of the windows 22C relative to the two-dimensional image display pixels are shifted by a half (h/a=½; $\underline{a}$ is an integer) of the width of each two-dimensional image display pixel whenever the two-dimensional image display pixel line increases, but the shift direction is reversed in accordance with every line. As a result, the positions of the windows are changed in zigzag. Also in this example, the phase of occurrence of moiré is shifted by near π between lines, so that the position of occurrence of moiré is dispersed. When the width of each line is sufficiently small, moiré in which the period is increased to twice and the contrast is reduced to half is visually recognized.

Figure 22:
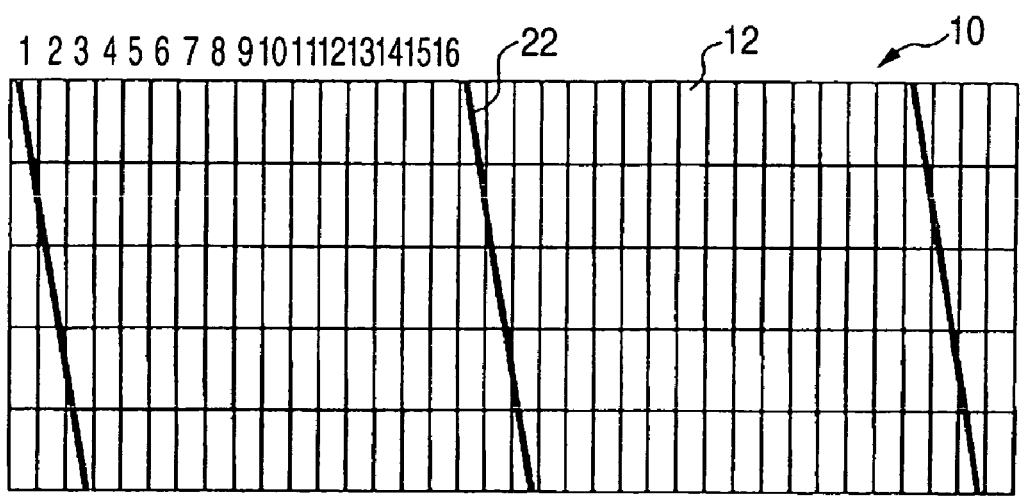
FIG. 22 is a plan view showing an example of arrangement of a mask and a display surface in the three-dimensional image display device according to an embodiment of the invention in which two-dimensional image display pixels are arranged on each line in the form of stripes, and the positions of windows relative to the two-dimensional image display pixels is shifted in accordance with each two-dimensional image display pixel line while the pitch of the windows is kept constant.

FIG. 22 shows an example in which the windows 22C extend obliquely to cross the lines of the two-dimensional image display pixels and in which the positions of the windows 22C relative to the two-dimensional image display pixels are shifted by a half (h/a=½) of the width of each two-dimensional image display pixel whenever one two-dimensional image display pixel line increases. Also in this example, the phase of occurrence of moiré is shifted by near π between lines, so that the position of occurrence of moiré is dispersed. When the width of each line is sufficiently small, moiré in which the period is increased to twice and the contrast is reduced to half is visually recognized.

Figure 23:
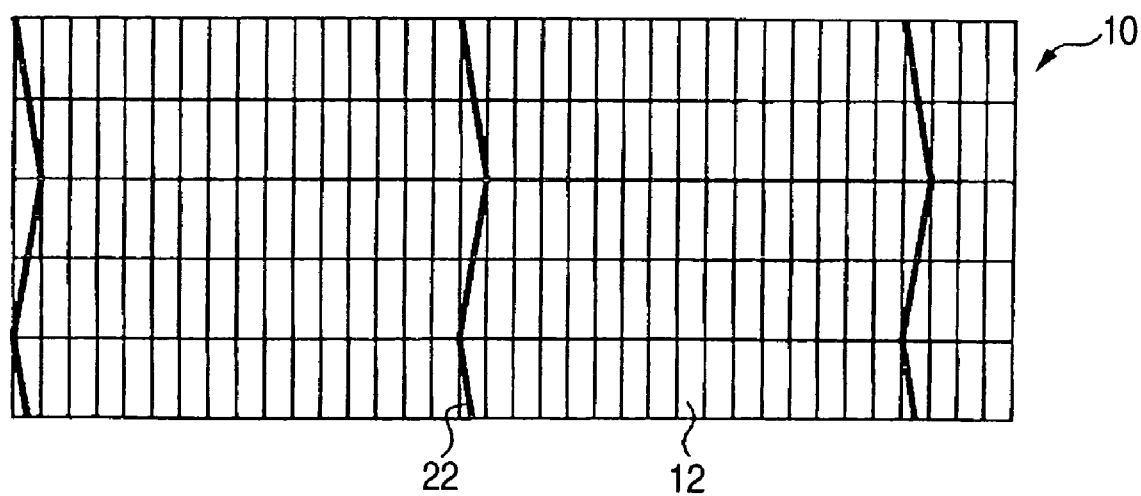
FIG. 23 is a plan view showing an example of arrangement of a mask and a display surface in the three-dimensional image display device according to an embodiment of the invention in which two-dimensional image display pixels are arranged on each line in the form of stripes, and the positions of windows relative to the two-dimensional image display pixels is shifted in accordance with each two-dimensional image display pixel line while the pitch of the windows is kept constant.

FIG. 23 shows an example in which the positions of the windows 22C crossing the lines of the two-dimensional image display pixels relative to the two-dimensional image display pixels are shifted by a half (h/a=½) of the width of each two-dimensional image display pixel, but the shift direction is reversed in accordance with every line. As a result, the windows extend in zigzag. Also in this example, the phase of occurrence of moiré is shifted by near π between lines, so that the position of occurrence of moiré is dispersed. When the width of each line is sufficiently small, moiré in which the period is increased to twice and the contrast is reduced to half is visually recognized.

Figure 24:
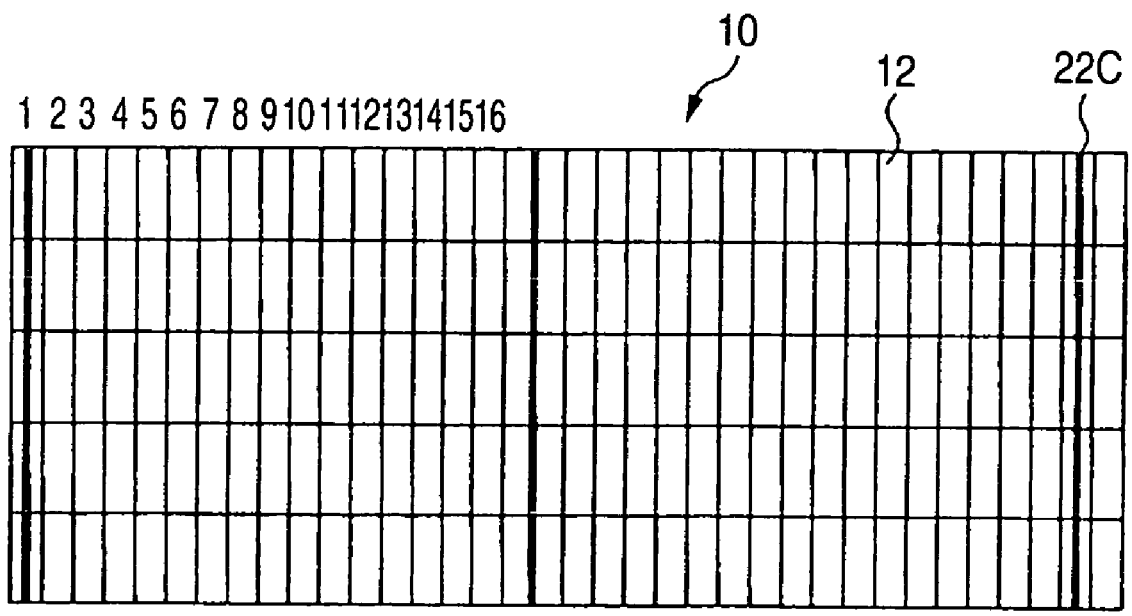
FIG. 24 is a plan view showing an example of arrangement of a mask and a display surface in the three-dimensional image display device according to an embodiment of the invention in which two-dimensional image display pixels are arranged on each line in the form of stripes, and the pitch of windows is shifted in accordance with each element image.

On the other hand, in FIG. 24, the phases of the windows 22C are shifted horizontally by a half (i/b=½) of the width of each two-dimensional image display pixel in accordance with every $\underline{m}$ two-dimensional image display pixel columns. In the expression, $\underline{b}$ and $\underline{i}$ are integers and satisfy the relation i<b. That is, in FIG. 24, an example of 16.5 pieces of parallax is shown in the case of i/b=½. Accordingly, in the display in the example shown in FIG. 24, 16 or 17 pieces of parallax are given to one element image, so that the loci of light rays for forming two element images are nested. Also in this structure, because the positions of the windows of the mask relative to the two-dimensional image display pixels of the display unit are shifted by a half of the width of each two-dimensional image display pixel between adjacent windows, the phase of occurrence of moiré is shifted horizontally by near π in accordance with every element image, so that the position of occurrence of moiré is dispersed.

Figure 25:
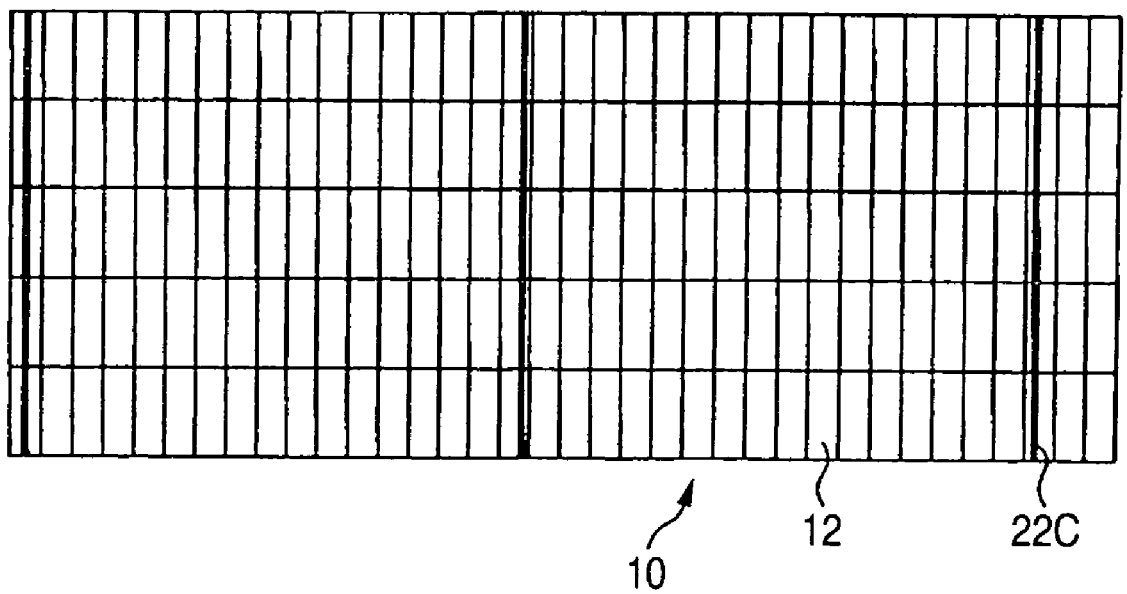
FIG. 25 is a plan view showing an example of arrangement of a mask and a display surface in the three-dimensional image display device according to an embodiment of the invention in which two-dimensional image display pixels are arranged on each line in the form of stripes, and the positions of windows relative to the two-dimensional image display pixels is shifted in accordance with each two-dimensional image display pixel line and the pitch of the windows is shifted in accordance with each element image while the pitch of the windows is kept constant.

In FIG. 25, the phases of the windows 22C are shifted horizontally by (i/b=⅓) of the width of each two-dimensional image display pixel in accordance with every $\underline{m}$ two-dimensional image display pixel columns. That is, in FIG. 25, an example of 16.33 pieces of parallax is shown in the case of i/b=⅓. Accordingly, in the display in the example shown in FIG. 25, 16 or 17 pieces of parallax are given to one element image, so that 17 pieces of parallax are generated in accordance with every three element images. The loci of light rays for forming three element images are nested. Also in this structure, because the positions of the windows of the mask relative to the two-dimensional image display pixels of the display unit are shifted by ⅓ of the width of each two-dimensional image display pixel between adjacent windows, the phase of occurrence of moiré is shifted horizontally by near 2π/3 in accordance with every element image, so that the position of occurrence of moiré is dispersed.

Figure 26:
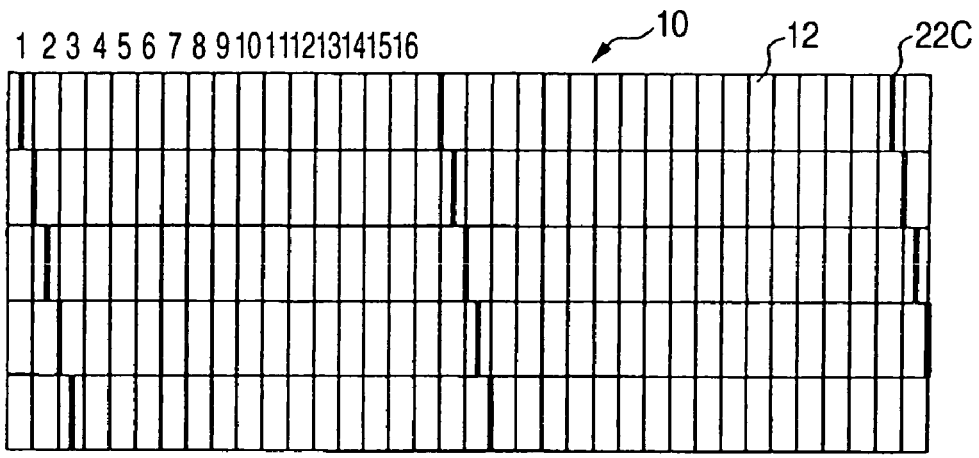
FIG. 26 is a plan view showing an example of arrangement of a mask and a display surface in the three-dimensional image display device according to an embodiment of the invention in which two-dimensional image display pixels are arranged on each line in the form of stripes, and the positions of windows relative to the two-dimensional image display pixels is shifted in accordance with each two-dimensional image display pixel line and the pitch of the windows is shifted in accordance with each element image while the pitch of the windows is kept constant.
Figure 27:
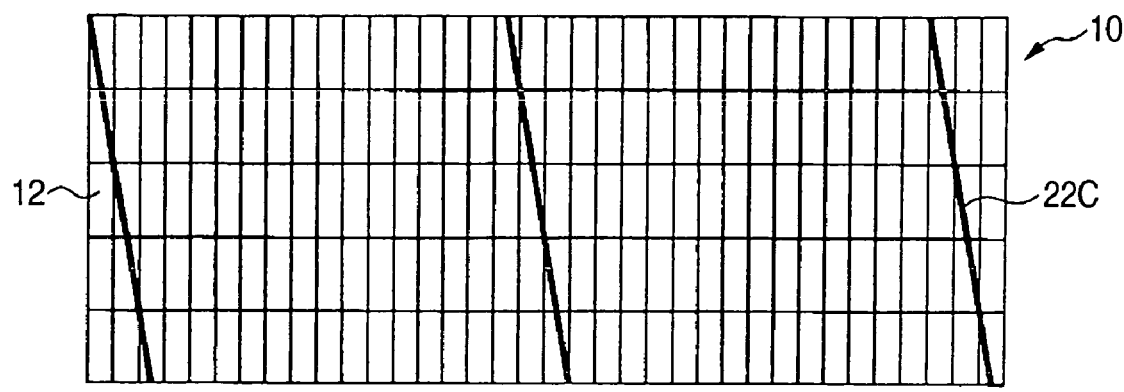
FIG. 27 is a plan view showing an example of arrangement of a mask and a display surface in the three-dimensional image display device according to an embodiment of the invention in which two-dimensional image display pixels are arranged on each line in the form of stripes, and the positions of windows relative to the two-dimensional image display pixels is shifted in accordance with each two-dimensional image display pixel line and the pitch of the windows is shifted in accordance with each element image while the pitch of the windows is kept constant.

In FIG. 26, the positions of the windows 22C relative to the two-dimensional image display pixels are shifted by a half (h/a=½) of the width of each two-dimensional image display pixel whenever the two-dimensional image display pixel line increases. Further, the positions of the windows 22C relative to the two-dimensional image display pixels are shifted horizontally by a half (i/b=½) of the width of each two-dimensional image display pixel between adjacent windows (h/a=i/b=½). Accordingly, the position of occurrence of moiré is dispersed both horizontally and vertically. When the width of each line and the width of each column are sufficiently small, moiré in which the period is increased to four times and the contrast is reduced to ¼ is visually recognized. In FIG. 27, the windows 22C extend obliquely to cross the lines of the two-dimensional image display pixels. The positions of the windows 22C relative to the two-dimensional image display pixels are shifted by a half (h/a=½) of the width of each two-dimensional image display pixel whenever one two-dimensional image display pixel line increases. The positions of the windows 22C relative to the two-dimensional image display pixels are shifted horizontally by a half (i/b=½) of the width of each two-dimensional image display pixel between adjacent windows (h/a=i/b=½, the relation h/a=½ is approximated obliquely). Accordingly, the position of occurrence of moiré is dispersed both horizontally and vertically. When the width of each line and the width of each column are sufficiently small, moiré in which the period is increased to four times and the contrast is reduced to ¼ is visually recognized.

Figure 28:
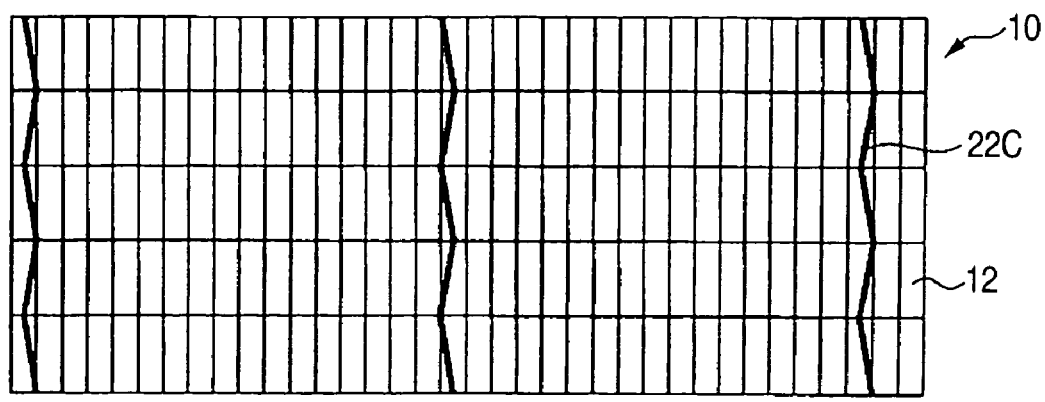
FIG. 28 is a plan view showing an example of arrangement of a mask and a display surface in the three-dimensional image display device according to an embodiment of the invention in which two-dimensional image display pixels are arranged on each line in the form of stripes, and the positions of windows relative to the two-dimensional image display pixels is shifted in accordance with each two-dimensional image display pixel line and the pitch of the windows is shifted in accordance with each element image while the pitch of the windows is kept constant.

In FIG. 28, the windows 22C extend in zigzag to cross the lines of the two-dimensional image display pixels. The positions of the windows 22C relative to the two-dimensional image display pixels are shifted by a half (h/a=½) of the width of each two-dimensional image display pixel whenever one two-dimensional image display pixel line increases. The positions of the windows 22C relative to the two-dimensional image display pixels are shifted horizontally by a half (i/b=½) of the width of each two-dimensional image display pixel between adjacent windows. Accordingly, the position of occurrence of moiré is dispersed both horizontally and vertically. When the width of each line and the width of each column are sufficiently small, moiré in which the period is increased to four times and the contrast is reduced to ¼ is visually recognized.

It has been further proved that the following structure is effective as measures to prevent increase in photograph directions in dispersion of moiré due to change in the positions of the windows relative to the two-dimensional image display pixels. To prevent increase in photograph directions, only boundaries between the two-dimensional image display pixels are changed while the positions of the windows relative to the two-dimensional image display pixels are kept constant. When the period of the boundaries is set to be not larger than the pitch of the two-dimensional image display pixels, the positions of the windows relative to the two-dimensional image display pixels can be kept constant. When the shaking width of the boundaries is made perfectly coincident with the pitch of the two-dimensional image display pixels, reduction in luminance in the display surface due to the visual recognition of the non-pixel regions can be dispersed perfectly.

Although JP2003-121786(kokai) is a related example in which the horizontal positions of light ray control elements are shifted, the thought in JP2003-121786(kokai) is quite different from that in this invention because the shift value in JP2003-121786(kokai) is made coincident with the pitch of sub pixels so that there is no effect of dispersing the position of occurrence of moiré.

The above description can be rearranged as follows. A three-dimensional image display device has a display unit including pixel groups arranged in the form of a matrix for displaying element images respectively, and a mask including windows corresponding to the pixel groups, wherein the positions of the pixels relative to the windows are changed repetitively and cyclically.

To satisfy this condition, configuration can be made as follows. Each of the two-dimensional image display pixels in the display unit is shaped like a rectangle. The two-dimensional image display pixels are arranged as stripe arrangement. Each of the windows in the mask is substantially shaped like a rectangle corresponding to the shape of each two-dimensional image display pixel. The windows are formed as a combination of step shapes shifted horizontally. In another configuration, each of the two-dimensional image display pixels in the display unit is substantially shaped like a rectangle. The two-dimensional image display pixels are arranged in such a manner that the horizontal positions of the two-dimensional image display pixels are shifted. The windows in the mask are formed as a combination of stripe shapes continuous vertically. In another configuration, each of the two-dimensional image display pixels in the display unit is shaped like a rhombus having oblique boundaries. The boundaries of the two-dimensional image display pixels are continuous while the horizontal positions of the two-dimensional image display pixels are shifted. The windows in the mask are formed as a combination of stripe shapes continuous vertically. In another configuration, each of the two-dimensional image display pixels in the display unit is shaped like a rectangle. The two-dimensional image display pixels are arranged as stripe arrangement. The windows in the mask are formed as a combination of non-vertical stripe shapes while the horizontal positions of the windows are shifted.

Examples according to the embodiments of the invention will be described below.

EXAMPLE 1

In Example 1, only horizontal parallax effective for stereoscopic view is given to a display image. QUXGA-LCD (the number of two-dimensional image display pixels: 3200×2400, screen size: 422.4 mm×316.8 mm, delta arrangement) is used as a liquid crystal display unit. The minimum drive unit is each of two-dimensional image display pixels of R, G and B. Although one pixel (triplet) is generally constituted by three sub pixels of R, G and B arranged laterally (horizontally), each of the sub pixels of R, G and B is regarded as one two-dimensional image display pixel in the display unit in this example to increase the number of two-dimensional image display pixels in the horizontal direction. Mosaic is used as the arrangement of R, G and B. Each two-dimensional image display pixel is 44 μm wide and 132 μm long. A backlight unit is disposed on the back of the display unit. Lenticular lenses arranged at intervals of 0.726 mm equivalent to 16.5 two-dimensional image display pixels for giving only horizontal parallactic information are combined on the observer side. The lenticular lenses are designed so as to be substantially focused on the boundary between a glass plate and a color filter constituting the liquid crystal display unit.

Respective parameters were set at values shown in Table 1.

TABLE 1

| Parameter | Symbol and Value |
| --- | --- |
| Number of horizontal two-dimensional image display pixels | The size H = 3200 |
| Number of pieces of parallax | Nvs = 16.5 |
| Horizontal width of two-dimensional image display pixel [mm] | Hp = 0.044 |
| Viewing distance [mm] | L = 1000 |
| Width of visual range at viewing distance [mm] | W = 422.4 |
| Width of display surface [mm] | H = 3 · Hp · the size H |
| Gap [mm] | g = L · Nvs · Hp/W |

Because the lenticular lenses having a lens pitch shifted by ½ from an integer multiple of the width of each two-dimensional image display pixel were combined with the liquid crystal display unit of delta arrangement, vertical resolution was reduced to half but horizontal resolution was increased to twice compared with the case of a liquid crystal display unit of stripe arrangement. As a result, the depth reproduction distance of the three-dimensional display device was increased. It was confirmed that reduction in luminance derived from the BM was not recognized as moiré fringes though the horizontal numerical aperture of the two-dimensional image display pixels in the liquid crystal display unit was a little less than 50%.

EXAMPLE 2

The liquid crystal display unit was provided as a stripe array. Lenses were shaped so obliquely as to be shifted horizontally by ½×hp_h in accordance with every line as shown in FIG. 27. The display device was designed in the same manner as in Example 1 except the aforementioned fact. As a result, it was confirmed that reduction in luminance derived from the BM was not recognized as moiré fringes.

EXAMPLE 3

The liquid crystal display unit was provided as a stripe array. Lenses were shaped in such zigzag that the lenses were shifted horizontally by ½×hp_h in accordance with every line while the shift direction was reversed in accordance with every line as shown in FIG. 28. The display device was designed in the same manner as in Example 1 except the aforementioned fact. As a result, it was confirmed that reduction in luminance derived from the BM was not recognized as moiré fringes.

EXAMPLE 4

The liquid crystal display unit was provided as a stripe array. Lenses were shaped in zigzag with such a short period that the shaking width of the lenses was ±(½)×hp_h in one line and one period was equal to the height of one line. The display device was designed in the same manner as in Example 1 except the aforementioned fact. As a result, it was confirmed that reduction in luminance derived from the BM was not recognized as moiré fringes.

EXAMPLE 5

The liquid crystal display device was designed in the same manner as in Example 1 except that the centers of the two-dimensional image display pixels were located so as to be equivalent to delta arrangement in which the boundaries between the two-dimensional image display pixels in the liquid crystal display unit were shifted horizontally by ½× hp_h in accordance with every line, and that the boundaries between the two-dimensional image display pixels were shaped so obliquely as to be continuous between the two-dimensional image display pixels while each of the two-dimensional image display pixels was shaped like a rhombus. As a result, it was confirmed that reduction in luminance derived from the BM was not recognized as moiré fringes.

EXAMPLE 6

The liquid crystal display device was designed in the same manner as in Example 1 except that the centers of the two-dimensional image display pixels were located so as to be equivalent to delta arrangement in which the boundaries between the two-dimensional image display pixels in the liquid crystal display unit were shifted horizontally by ½× hp_h in accordance with every line, and that the boundaries between the two-dimensional image display pixels were shaped so obliquely as to be continuous between the two-dimensional image display pixels while the oblique boundaries were shaped in zigzag so that the inclination of the oblique boundaries was reversed in accordance with every line. As a result, it was confirmed that reduction in luminance derived from the BM was not recognized as moiré fringes.

COMPARATIVE EXAMPLE 1

The liquid crystal display device was designed in the same manner as in Example 1 except that the lens pitch was set at 16×hp_h and the liquid crystal display unit arranged as stripe arrangement is combined with the lenses. As a result, it was confirmed that about 20 vertical moiré fringes were clearly visually recognized in the viewing distance.

COMPARATIVE EXAMPLE 2

The display device was designed substantially in the same manner as in Example 1 except that the horizontal numerical aperture of the liquid crystal display unit was controlled to 50% and that the lens pitch was set at a value slightly smaller than 16.5×hp_h to collect light rays at the viewing distance to thereby provide the display device as a multi-view type display device. As a result, change in luminance supposed to be caused by aberration of the lenses was visually recognized when the head moved left and right at the viewing distance though the horizontal numerical aperture was controlled.

What is claimed is:
1. A three-dimensional image display device comprising:
   a display unit including pixels arranged in a form of a matrix, the pixels forming pixel groups configured to display element images;
   a mask including windows corresponding to the pixel groups, wherein:
   relative positions of the pixel groups to the windows change cyclically;

vertically adjacent pixel lines or vertically adjacent regions each including a plurality of pixel lines are provided so that horizontal positions of the pixels relative to the windows are shifted by (h/a) times (in which a is an integer satisfying a relation 2≦a<6, and h is an integer satisfying a relation 0<h<(a−1)) as large as a horizontal pitch of the pixels;

regions each including a plurality of horizontally adjacent pixel columns are provided so that horizontal positions of the pixels relative to the windows are shifted by (i/b) times (in which b is an integer satisfying a relation 2≦b<6, and i is an integer satisfying a relation 0<i<(b−1)) as large as the horizontal pitch of the pixels; and as a result of repetition executed while positions of the pixels relative to the windows are shifted by (h/a) vertically and by (i/b) horizontally, the same horizontal positions of the pixels relative to the windows appear cyclically every {(a/h)−1} pixels vertically and every {(i/b)−1} pixels horizontally.

2. The three-dimensional image display device according to claim 1, wherein adjacent regions each composed of a plurality of vertically adjacent pixel lines are provided so that vertical positions of the pixels relative to the windows are shifted by (j/c) times (in which c is an integer satisfying a relation 2≦c<6, and j is an integer satisfying a relation 0<j<(c−1)) as large as a vertical pitch of the pixels;

regions each composed of a plurality of horizontally adjacent pixel columns are provided so that the vertical positions of the pixels relative to the windows are shifted by (k/d) times (in which d is an integer satisfying a relation 2≦d<6, and k is an integer satisfying a relation 0<k<(d−1)) as large as the vertical pitch of the pixels; and as a result of the repetition executed while the positions of the pixels relative to the windows are shifted by (j/c) vertically and by (k/d) horizontally, the same vertical positions of the pixels relative to the windows appear cyclically every {(c/j)−1} windows vertically and every {(d/k)−1} windows horizontally.

3. The three-dimensional image display device according to claim 2, wherein c/j=2.

4. The three-dimensional image display device according to claim 3, wherein slits are provided in the mask.

5. The three-dimensional image display device according to claim 3, wherein lenticular sheets are provided in the mask.

6. The three-dimensional image display device according to claim 2, wherein color filter arrangement in the display unit is mosaic arrangement.

7. The three-dimensional image display device according to claim 6, wherein slits are provided in the mask.

8. The three-dimensional image display device according to claim 6, wherein lenticular sheets are provided in the mask.

9. The three-dimensional image display device according to claim 1, wherein a/h=2.

10. The three-dimensional image display device according to claim 9, wherein parallactic information is given to only pixels arranged horizontally.

11. The three-dimensional image display device according to claim 10, wherein slits are provided in the mask.

12. The three-dimensional image display device according to claim 10, wherein lenticular sheets are provided in the mask.

13. The three-dimensional image display device according to claim 1, wherein parallactic information is given to only pixels arranged horizontally.

14. The three-dimensional image display device according to claim 13, wherein slits are provided in the mask.

15. The three-dimensional image display device according to claim 13, wherein lenticular sheets are provided in the mask.

16. The three-dimensional image display device according to claim 1, wherein color filter arrangement in the display unit is mosaic arrangement.

17. The three-dimensional image display device according to claim 16, wherein slits are provided in the mask.

18. The three-dimensional image display device according to claim 16, wherein lenticular sheets are provided in the mask.

19. The three-dimensional image display device according to claim 1, wherein a horizontal numerical aperture is different from (h/a×i/b).

20. The three-dimensional image display device according to claim 19, wherein slits are provided in the mask.

21. The three-dimensional image display device according to claim 19, wherein lenticular sheets are provided in the mask.

22. The three-dimensional image display device according to claim 1, wherein a vertical numerical aperture is different from (j/c×k/d).

23. The three-dimensional image display device according to claim 22, wherein slits are provided in the mask.

24. The three-dimensional image display device according to claim 22, wherein lenticular sheets are provided in the mask.

* * * * *